(12) United States Patent
Shah et al.

(10) Patent No.: US 10,999,289 B2
(45) Date of Patent: May 4, 2021

(54) SYSTEM AND METHODS FOR ACHIEVING END-TO-END SECURITY FOR HOP-BY-HOP SERVICES

(71) Applicant: CONVIDA WIRELESS, LLC, Wilmington, DE (US)

(72) Inventors: Yogendra C. Shah, Exton, PA (US); Vinod Kumar Choyi, Conshohocken, PA (US); Dale N. Seed, Allentown, PA (US); Michael F. Starsinic, Newtown, PA (US); William Robert Flynn, IV, Schwenksville, PA (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 203 days.

(21) Appl. No.: 15/770,900

(22) PCT Filed: Oct. 28, 2016

(86) PCT No.: PCT/US2016/059403
§ 371 (c)(1),
(2) Date: Apr. 25, 2018

(87) PCT Pub. No.: WO2017/075410
PCT Pub. Date: May 4, 2017

(65) Prior Publication Data
US 2018/0332047 A1 Nov. 15, 2018

Related U.S. Application Data

(60) Provisional application No. 62/248,621, filed on Oct. 30, 2015.

(51) Int. Cl.
*H04L 29/06* (2006.01)

(52) U.S. Cl.
CPC ........ *H04L 63/105* (2013.01); *H04L 63/0464* (2013.01); *H04L 63/20* (2013.01); *H04L 63/205* (2013.01)

(58) Field of Classification Search
CPC .. H04L 63/105; H04L 63/0464; H04L 63/205
See application file for complete search history.

(56) References Cited

U.S. PATENT DOCUMENTS

| | | | |
|---|---|---|---|
| 2008/0194275 A1* | 8/2008 | Koch | ...................... H04L 51/04 455/457 |
| 2009/0264712 A1* | 10/2009 | Baldus | ................. A61B 5/0002 600/300 |

(Continued)

OTHER PUBLICATIONS

OneM2M TS-0001-V1.6.1, "Functional Architecture" Jan. 30, 2015, 321 pages.

(Continued)

*Primary Examiner* — Anthony D Brown
*Assistant Examiner* — Rodman Alexander Mahmoudi
(74) *Attorney, Agent, or Firm* — BakerHostetler

(57) ABSTRACT

An IoT E2E Service Layer Security Management system supports methods and procedures to allow an application to establish, use, and teardown an IoT SL communication session that has application specified E2E security preferences and that targets one or more SL addressable targets (e.g., an IoT application, device, or gateway SL addressable resource). E2E SL Session based methods and procedures described herein achieve a required overall E2E security level, by allowing IoT SL instances to influence and coordinate hop security for a multi-hop communication path spanning across multiple intermediary nodes. The methods and procedures described herein reduce overhead, simplify and obviate the need for E2E service level nodes (initiation and termination nodes) from having to perform security service negotiation, in order to establish secure hop-by-hop (Continued)

security associations aligned with an E2E security requirement.

22 Claims, 24 Drawing Sheets

(56) References Cited

U.S. PATENT DOCUMENTS

| | | | | |
|---|---|---|---|---|
| 2011/0283339 A1* | 11/2011 | Smith | ................... | H04L 63/083 |
| | | | | 726/4 |
| 2013/0232559 A1* | 9/2013 | Bello | ..................... | H04L 45/42 |
| | | | | 726/4 |
| 2014/0304777 A1* | 10/2014 | Lehtovirta | .............. | H04W 4/70 |
| | | | | 726/3 |
| 2015/0033311 A1 | 1/2015 | Seed et al. | | |

OTHER PUBLICATIONS

ETSI TS 102 690 V2.1.14, "Machine-to-Machine Communications (M2M); Functional Architecture", Jul. 2013, 332 pages.
OneM2M TS-0001-V1.1.0, "oneM2M Functional Architecture Baseline Draft", Aug. 9, 2014, 367 pages.
OneM2M Input Contribution TP#4 ARC 0244 WG, "Proposal for M2M service layer capabilities", Mar. 30, 2013, 5 pages.
OneM2M Input Contribution TP#8 ARC0563-SSM, "Service Session Management (SSM) CSF Resources" Nov. 13, 2013, 7 pages.

* cited by examiner

SYSTEM AND METHODS FOR ACHIEVING END-TO-END SECURITY FOR HOP-BY-HOP SERVICES

CROSS-REFERENCE TO RELATED APPLICATIONS

This Application is a National Stage Application filed under 35 U.S.C. § 371 of International Application No. PCT/US2016/059403, filed Oct. 28, 2016, which claims the benefit of U.S. Provisional Patent Application Ser. No. 62/248,621, filed Oct. 30, 2015, the disclosure of which is hereby incorporated by reference as if set forth in its entirety.

BACKGROUND

The Internet of Things (IoT) is enabling a huge volume of devices from small footprint, low performance, battery sipping sensors through to smart meters with a high grade of security and everything in between to connect to each other. This connectivity of "things" has brought with it an unprecedented number of use cases, some new uses cases never dreamt of previously and some disrupting existing very vertically oriented use cases such as telemetry. Many industry players and standards organizations are in the process of defining an architecture and framework, which can enable rapid deployment of these use cases and the services they are capable of delivering. At the heart of the architectures emerging is an IoT Service Layer (SL), which specifically targets the delivery of value-added services for IoT devices and applications. Recently, several industry standard bodies (e.g., oneM2M [oneM2M-TS-0001, oneM2M Functional Architecture-V-1.6.1] and ETSI [ETSI TS 102 690 Machine-to-Machine communications (M2M) Functional architecture V2.0.13]) have been developing IoT SLs to address the challenges associated with the integration of IoT devices and applications into deployments with the Internet/Web, cellular, enterprise, and home networks.

In many IoT use cases and network deployments direct communication between backend applications and deployed devices in the field is just not feasible. Many IoT devices or applications have no choice but to rely on IoT Gateways and Servers for value added services such as providing the device with wide area network connectivity, security and data storage services so that data can be securely accessed during active connections as well as intermittent connections and periods when the device loses its connectivity to the network.

As a result of the varied architectural deployments the IoT SL also has to cater for scenarios where data is delivered in a manner whereby the continuity of a communication or data transmission may be broken and reliant upon the connectivity and capabilities of intermediate nodes. Actions such as store-and-forward of messages can occur in the SL instances by passing from one node to another (e.g. on the IoT Gateways and Servers), sometimes waiting for the next hop in a communication path to become reachable.

Hence an End-to-End (E2E) communication between two IoT devices or applications may typically traverse multiple underlying access network technologies and result in multiple hops, each with its own varied and different level of security. The communications security provided by one hop may be very different from other hops and the ability to control the communications security in an E2E manner becomes a challenge. The purpose of this disclosure is to provide a framework to enhance the existing hop-by-hop communications security at the SL to provide E2E communications security in a coordinated manner whereby the two end nodes (devices or applications) of a SL communications session are able to influence and coordinate the hop-by-hop communications security to achieve and coordinate an effective E2E communications security.

An IoT Service Layer (SL) is a technology specifically targeted towards providing value-added services for IoT devices and applications. Recently, several industry standard bodies (e.g., oneM2M and ETSI) have been developing IoT SLs to address the challenges associated with the integration of IoT devices and applications into deployments with the Internet/Web, cellular, enterprise, and home networks.

An IoT SL can provide applications and devices access to a collection of IoT oriented common service capabilities. A few examples include security, authorization, charging, data management, device management, discovery, provisioning, and connectivity management. These capabilities are made available to applications via APIs which make use of message formats, resource structures and resource representations supported by the IoT SL.

From a protocol stack perspective, SLs are typically situated above the Application Protocol Layer and provide value added services to the applications they support. Hence SLs are often categorized as 'middleware' services. FIG. 1 shows an exemplary service layer 102 between the Application Protocols 106 and Applications 104.

A communication session typically involves a persistent interactive exchange of information between two or more communicating entities (e.g. devices, applications, etc). A communication session is established at a certain point in time, and torn down at a later point in time based on various circumstances (e.g. after the session times out or when one of the entities decides to terminate the session). A communication session typically involves the exchange of multiple messages between entities and is typically stateful, meaning that at least one of the communicating entities saves a session context to maintain the communication session. For example, maintaining a session context such as connectivity, registration, security, scheduling, and data that is applicable to the session participants.

Communication sessions may be implemented as part of the protocols and services at various layers in a network protocol stack. As an example, FIG. 2 shows communication connections or sessions established between network nodes at the transport protocol layer (e.g. TCP connection), session protocol layer (e.g. TLS and DTLS sessions), Web transport protocol layer (e.g. HTTP and CoAP sessions), IoT SL (e.g. oneM2M sessions [ARC-2013-244R04, oneM2M contribution, M2M Service Layer Capabilities, Mar. 30, 2013]), and application-specific sessions.

An application session is a communication session between two or more applications that is established and managed by the applications themselves (i.e. over-the-top) rather than by an underlying communication protocol or SL. As a result, application sessions can add extra overhead and complexity to applications. For example, application session require applications to configure, establish, and manage sessions themselves. This can involve creation and management of a session context such as a security association, routing information, discovery information, location, transaction history, and data.

An IoT SL session can be a communication session that is facilitated by the value-added session management services supported by a SL. These services can include capabilities such as mechanisms for establishing a SL session between SL endpoints as well as collecting and maintaining context pertinent to the SL session and its endpoints. A SL session can be established between two or more SL session endpoints where these endpoints can be applications and/or SL instances. At a minimum however, at least one SL instance participates in the session to function as the facilitator of the SL session (i.e. provide the necessary SL session management functionality).

Communications in the IoT occur by propagating a message either directly to a destination node or through one or more intermediate nodes. The communications can be RESTful in nature and a communication is formed by a transaction comprising a Request message and a Response message. This form of communication in the IoT is referred to as a hop-by-hop communication. In the spirit of creating the equivalency of security for a SL session or an E2E communication using the framework of a hop-by-hop communication, we provide here an over-arching framework which addresses the security requirements. In particular the intent is to ensure that the different hop nodes conform to a common set of security requirements thus fulfilling the spirit of protecting SL communications as they propagate over various underlying networks. We call this SL session security since the intent is to provide security similar to an E2E security for RESTful communications.

A no-hop or zero-hop is a direct source to destination node communication without assistance from an intermediate node. A hop is a communication which occurs over one intermediate node. Additional intermediate nodes add to the number of hops required to reach a final destination node.

FIG. 3 shows some examples of IoT SL sessions, which will be used to illustrate establishment of communications security between the various entities.

Example 1 shows a SL session established between two applications 302 and 304 spanning across a common SL instance 306, hence this is an example of a 1-hop SL session established via a SL instance 306.

In Example 2:
  Example 2 part (a) shows a SL session established between an application 308 and a SL instance 310. This is an example of a 1-hop SL session since it is established via a SL instance 310.
  Example 2 part (b) shows a SL session established between an application 312 and a SL instance 310. This is an example of a SL session without a hop.

Example 3 shows a SL session established between two applications 314 and 316 via two SL instances and is an example of a 2-hop SL session. One SL instance is shared with Examples 1 and 2 and share a common hop.

One benefit of the IoT SL sessions is that they can be used to offload applications from the burden of having to establish and maintain their own application-based sessions. This is because a SL session differs from an application session in that, the brunt of the overhead involved with establishing and maintaining the communications session is offloaded to the SL such that applications are not burdened with this responsibility. Some examples of overhead that can be offloaded to the SL can include creation and management of a session context such as a security association, routing information, discovery information, location, transaction history, and data. Another benefit is that a SL session can be layered on top of one or more underlying transport or access network communication sessions/connections. Some examples include but are not limited to Web transport protocol sessions (e.g. HTTP session), session layer sessions (e.g. TLS session), transport layer connections (e.g. TCP), underlying access network connections (e.g. 3GPP, Broadband Ethernet, Wi-Fi, Bluetooth). This layering allows a SL session to support persistency with regards to lower layer sessions/connections such that the SL session can persist and be maintained independent of the setup and teardown of lower layer sessions/connections. For example, a SL session can persist in spite of its underlying TCP/TLS sessions being repeatedly setup and torn-down, which is fairly typical during the course of normal network communication (e.g. due to power saving methods and mobility).

The establishment of an IoT SL session between session participants can either be initiated as part of the SL registration process or as a separate process thereafter. Once established, a SL session can be used to collect and maintain a SL context pertaining to the session participants and the communication that takes place between them. For example, a SL session context such as a registration state and a security association for the session participants, subscription criteria and contact information for session participants, session participant data stored in SL resources, history of transactions performed by session participants can be collected and maintained for each session. The termination of a SL session between session participants can either be initiated as part of the SL de-registration process or as a separate process performed before de-registration takes place.

A noteworthy point to highlight is that the establishment of a SL session as well as the management of the SL session context during the lifetime of a particular SL session can involve a significant amount time, storage and effort on behalf of the session participants. Hence the persistent nature of a SL session is one of its major value-added differentiators compared to lower layer transport and access network sessions which lack this persistency. A persistent SL session can be used to maintain a SL session context on behalf of applications such that they do not have to maintain this information themselves. In addition when a lower layer connection/session is torn down the SL session context can persist and when the lower layer connection is re-established, this context will still be available to an application. Hence this context can be maintained independently from the non-persistent underlying transport layer or access network connections. Some examples of a SL session context can include SL registrations, subscriptions, security association, charging records, routing information, discovery information, location, transaction history, and data for applications.

Security for the service layer, in an IoT system, is supported through a hop-by-hop SL security scheme. An independent security association (SA) is established for each hop through a protocol exchange between:
  The two nodes at each end of the hop or
  An authentication server (AS) and the two nodes at each end of the hop.

Overall end-to-end (E2E) SL security is derived and determined by the independent hop-by-hop SL SAs and is therefore set by the lowest achieved hop security.

When two endpoints in an IoT system communicate with each other in a secure manner, the nodes and intermediate nodes establish a Security Association (SA) with one another in a hop-by-hop manner. Each hop establishes a separate SA, which is independent of the SA of other hops. A hop-by-hop SA may be established by means of shared keys, use of certificates or by a bootstrapping process, performed through assistance from an AS. The SA establishment results in a secure communications session at the service layer, which protects service layer messages being exchanged between two adjacent nodes in a hop-by-hop communications session.

Consider a scenario where two application nodes in an IoT system, AN1 and AN2, wish to communicate with each other through a common service node, SN. AN1 and the SN setup a SA between themselves, we refer to this communications segment as the first hop, and SN and AN2 setup a SA between themselves, we refer to this communications segment as the second hop. A message from AN1 to AN2 is sent to the SN through the established secure connection between AN1 and SN, hop one. This message is then processed at the service layer of SN and then re-packaged and sent through the established secure connection between SN and AN2, hop two. The communications between the two application nodes, AN1 and AN2 is therefore protected by the secure communications channels between the ANs and SN. Therefore the confidentiality and/or integrity of messages in-transit between the nodes is maintained through the protected, chained communications connections.

SUMMARY

Embodiments enable applications to perform end-to-end SL communications in a manner which meets desired E2E SL security requirements in a hop-by-hop manner.

E2E SL Security Management: A system for IoT E2E SL Security Management can support methods/procedures to allow an application to establish, use, and teardown an IoT SL communication session that has application specified E2E security preferences and that targets one or more SL addressable targets (e.g. an IoT application, device, or gateway SL addressable resource).

E2E SL Security Establishment Methods/Procedures: E2E SL Session based methods/procedures can achieve a required overall E2E security level, by allowing IoT SL instances to influence and coordinate hop security for a multi-hop communication path spanning across multiple intermediary nodes.

Simplify Hop Level Security Service Negotiation: Methods/procedures can reduce overhead, simplify and obviate the need for E2E service level nodes (initiation/termination nodes) from having to perform security service negotiation, in order to establish secure hop-by-hop security associations aligned with an E2E security requirement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 7 is a diagram of an IoT SL Session Example with the Aid of an AS.

DETAILED DESCRIPTION OF ILLUSTRATIVE EMBODIMENTS

Acronyms

Figure 1:
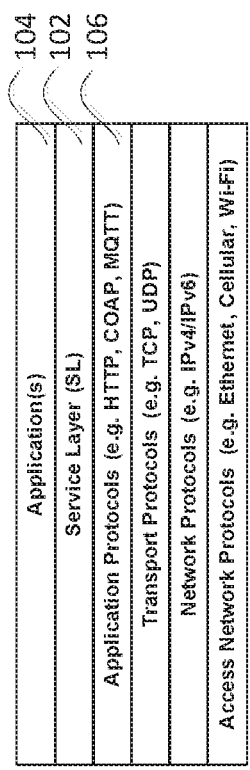
FIG. 1 is a diagram of an Exemplary Protocol Stack Supporting a Service Layer.
Figure 2:
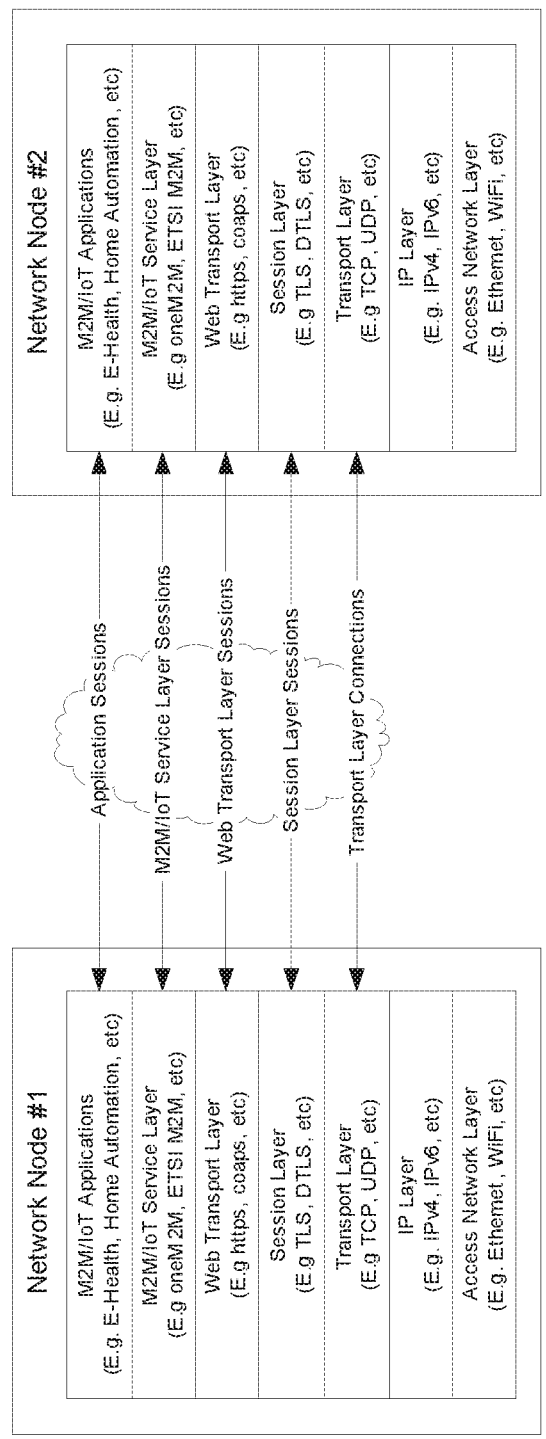
FIG. 2 is a diagram of Communication Sessions.

| | |
|---|---|
| AE | Application Entity |
| ACM | Access Control Manager |
| AS | Authentication Server |
| CSE | Common Service Entity |
| CSF | Common Service Function |
| E2E | End-to-End |
| FQDN | Fully Qualified Domain Name |
| IoT | Internet of Things |
| IP | Internet Protocol |
| M2M | Machine to Machine |
| QoS | Quality of Service |
| SCEF | Service Capability Enablement Function |
| SL | Service Layer |
| SLCM | Service Layer Connection Manager |
| SSM | Service Session Manager |
| UN | Underlying Network |
| UNCM | Underlying Network Connection Manager |

Terms

| | |
|---|---|
| IoT SL | Can be a software middleware layer that supports value-added services for IoT applications and devices through a set of Application Programming Interfaces (APIs) and underlying networking interfaces. |
| IoT application | Can be an application targeting a particular IoT use case (e.g. eHealth, smart energy, home automation). IoT applications are commonly categorized as device applications and backend applications. Device applications can be hosted on an IoT device and backend applications can typically interface to servers located in a datacenter/cloud located in the backend of a network. |
| IoT SL registrant | Can be an IoT application or another instance of an IoT SL which is registered to an IoT SL instance. |
| IoT SL session | Can be an exchange of information between IoT SL session participants. |
| IoT SL session participant/endpoint | Can be an IoT SL instance or an IoT application instance taking part in a particular IoT SL session. |

In many IoT use cases and network deployments direct communication between backend applications and deployed devices in the field is just not feasible. This is due to the resource constrained nature of the devices and their inability to support their own wide area network connectivity and maintain persistent and active network connections, which can strain the resource limits of the device (e.g. battery power). For these reasons, many IoT devices have no choice but to rely on IoT Gateways and Servers for value added services such as providing the device with wide area network connectivity, security and data storage services so that data can be securely accessed during active connections as well as periods when the device loses its connectivity to the network. As a result, an E2E communication between two IoT nodes may typically traverse multiple underlying access network technologies and result in multiple hops, each with its own varied and different level of security. The continuity of a communication or data transmission may be erratic and reliant upon the connectivity and capabilities of the intermediate nodes. Actions such as store-and-forward of messages may occur by passing the data from one node to another, sometimes waiting for the next hop in a communication path to become reachable.

A message may traverse through several intermediate nodes where the complete communications path may not be fully known. The underlying nature of the communication mechanism relies on a destination node identifier included in the message and the path is determined through a discovery and forwarding process performed by intermediate nodes. Hence given the nature of the communications systems architecture, the ability to perform a full E2E authentication and setup of a secure E2E channel or tunnel is not always practical as it is for conventional E2E communication protocols such as HTTP and TLS.

In order to align the SL security with the described IoT systems architecture, a hop-by-hop SL communications security is utilized at the service layer. However, the IoT SL technologies lack the capability to specify and manage the security of the E2E service layer sessions such that they are aligned with one another in a hop-by-hop manner as well as in an E2E manner to allow the E2E security required by an application to be met. As a result, vulnerabilities are introduced leading to a lack of security on the information being communicated and to malicious modification of the information being communicated.

Protecting the data prior to transmission (for example by protection of data at the application layer, sometimes referred to as object security) offers one means of protecting the data as it traverses through intermediate nodes to a final destination. However, for this to be practical, the encryption keys either need to be established or shared between two end points. Often this is not practical or feasible due to reachability considerations, delays and latencies required to establish the sharing of such information and the additional communications overhead introduced especially for small data transmissions.

Alternatively, the security at each node may be specified to meet the highest security level required to meet the requirements for all expected communications. However, this would place an undue burden on the communicating nodes and in many cases, over-provision the security.

Problems with prior systems are avoided by using:

E2E SL Security Management: A system for IoT E2E SL Security Management that can support methods/procedures to allow an application to establish, use, and teardown an IoT SL communication session that has application specified E2E security preferences and that targets one or more SL addressable targets (e.g. an IoT application, device, or gateway SL addressable resource).

E2E SL Security Establishment Methods/Procedures: E2E SL Session based methods/procedures that can achieve a required overall E2E security level, by allowing IoT SL instances to influence and coordinate hop security for a multi-hop communication path spanning across multiple intermediary nodes.

Simplify Hop Level Security Service Negotiation: Methods/procedures that can reduce overhead, simplify and obviate the need for E2E service level nodes (initiation/termination nodes) from having to perform security service negotiation, in order to establish secure hop-by-hop security associations aligned with an E2E security requirement.

Example Use Cases

There are many IoT use cases (e.g. eHealth, security systems, etc) where a backend application may require E2E communication with a specific IoT device application across various networks. Depending on the type of application and the type of device, these communications may have specific security requirements as captured in the following use case examples, with reference to FIG. 3. An eHealth use case is illustrated at a high level in FIG. 4 and in alignment with the detailed hop-by-hop sessions as described earlier in FIG. 3.

Use Case Example #1—A pharmaceutical company running clinical trials contracts a patient monitoring service to monitor one of the patients involved in a study. The service makes use of a patient monitoring application that establishes a communication session with the wearable medical sensors situated on the patient's body to collect data from multiple participants. The data is accumulated and processed for all participants, in a trial, by the IoT Network Application. To accommodate the security requirements in order to protect the patient's data, the pharmaceutical company specifies that a medium level of security is required to transport the data. From an end-to-end security perspective, setup of the hop-by-hop service layer security from the patient's wearable sensors to the clinical trials data collection and analysis functionality at the IoT Network Application requires a medium level of security.

Use Case Example #2—A patient monitoring service is used by the patient's physician to remotely monitor the patient for a chronic disease. To properly monitor the patient's condition, the physician requests that the service monitor for alerts that may be generated from an analysis of the patient's sensor data to identify when a critical event may be triggered (e.g. the patient's blood pressure reaching a critical level). The physician requests that due to the need to maintain a low false alarm rate and low false reject rate, integrity of the data be assured. The service therefore requests a high grade of security so that the service can then take appropriate actions such as notifying the doctor and/or emergency medical services, based on trustworthy data. From an end-to-end security perspective, setup of the hop-by-hop links for this session, from the patient's wearable sensors to the data collection and analysis service function in the IoT Service Layer Instance (communications segment 2a) and the follow-on connection to the IoT Network Application (communications segment 2b) requires a high level of security. The setup of the session link for segment 2a, requires joint use of one of the same hops as for Example #1.

Use Case Example #3—A patient monitoring service is used by a sleep therapist to remotely monitor the patient to diagnose a sleep insomnia problem the patient has been experiencing recently. To properly monitor this particular patient's condition, the therapist requests that the service monitor the patient's sleep activity. The therapist requests that the service provide a low level of security. The setup of this session link requires joint use of one of the same hops as for Example #1 and for Example #2.

Problems

Figure 5:
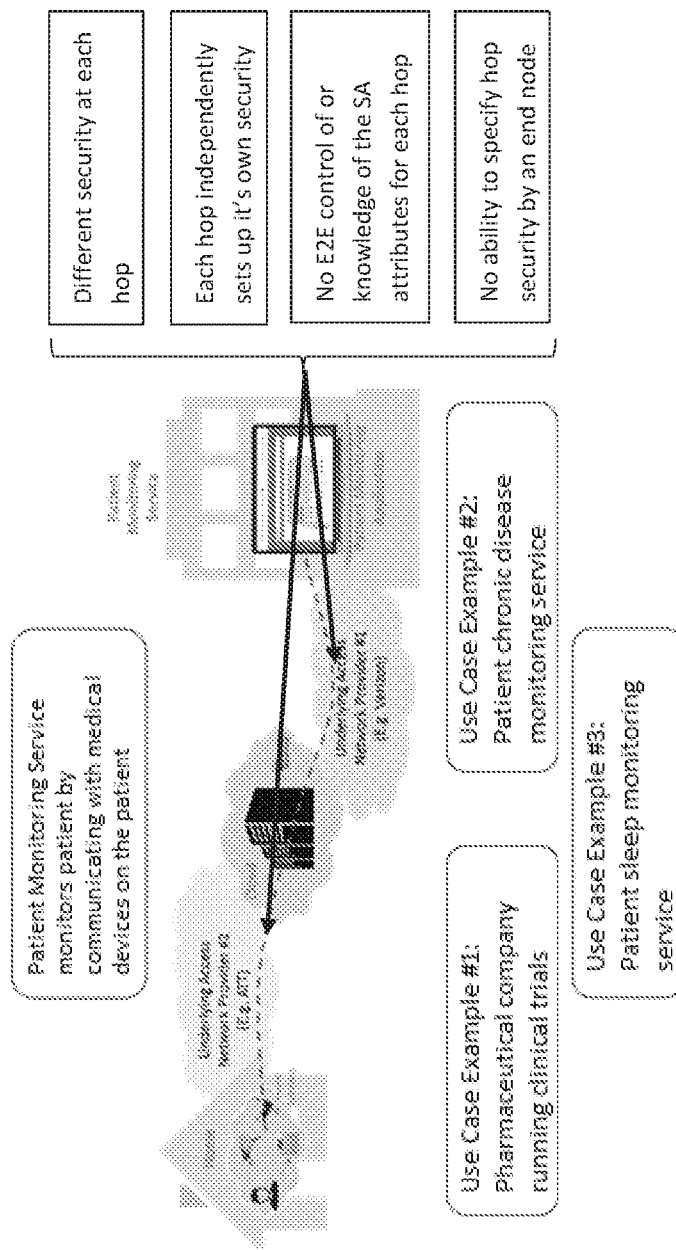
FIG. 5 is a diagram that illustrates problems in Influencing End-to-End IoT Security.

Current IoT SL technologies lack the capability to adjust the security for each hop such that the security from one hop to another may be aligned in a hop-by-hop manner as well as in an E2E manner, as required by an application. Due to the nature of the independent hop-by-hop security, potential security problems/issues may arise. The security of data being transmitted may be compromised due to a lack of adequate security measures as highlighted in FIG. 5 and described below:

Data security relies on independently derived hop-by-hop security associations and hence the overall security is determined by the hop with the lowest security.

The two nodes involved in an E2E communication are not fully aware of or in control of the complete hop-by-hop security or the hop with the lowest security.

The protocols used, keys used and algorithms used to derive session keys used to protect data communications are independently determined and may introduce vulnerabilities for the overall security.

Common security requirements required by the two communicating nodes are not considered when the hop-by-hop security is setup. Only the two end hops can be influenced by the communicating nodes since they are involved in establishing a Security Association (SA) for these end hops.

Different services may require varying levels of security and nodes may support different levels of security based on their individual capabilities. An individual node may support more than one SL session at the same time and the SL sessions may share the same link if the sessions are sharing a hop across the same two adjacent hop nodes. Hence what is required is a layered approach for security which can enable communicating nodes to discover, determine, and establish an overall security based on the unique capabilities of individual nodes. E2E nodes may negotiate and be aware of the security for each hop-by-hop connection as they establish an E2E communication. A central entity such as an AS may also help assess and facilitate establishment of overall E2E security.

In order to meet the security requirements for a SL session, there needs to be a facility to enable the overall E2E security requirements to be propagated to each hop of a communication session. Consider the following scenario using the current mechanisms for establishing security in a hop-by-hop manner.

The session link as described for Example 1 is setup with a SA established by each pair of communicating nodes in a hop-by-hop manner.

The setup of the session link for segment 2, requires joint use of one of the same hops as the first link for Example #1 and so depending upon the already established common hop security, the application requirements may or may not be met.

The setup of the session link for Example 3 is setup. This session link requires joint use of one of the same hops as for Example #1 and for Example #2. The pre-existing security level may most likely satisfy the low security requirement.

The overall result is that the security requirements for all of the applications may or may not be met and the security for an individual E2E session is determined by the lowest hop security.

Security Association and Security Levels

When two nodes wish to communicate with each other over a secure link, typically, a negotiation is carried out between the communicating entities. The negotiation involves discovery and agreement procedures. The discovery procedure enables the two entities to discover each other's capabilities in terms of the type and form of security links they are capable of establishing. The agreement is the dialog involved to establish a mutual agreement of the specific algorithms, key derivation parameters etc. that should be used to eventually perform an authentication and establish a session key to facilitate secure communications between the two entities. This agreement is often referred to as a security association (SA).

The nature of the discovery and agreement procedures can introduce significant overhead, especially when considering a hop-by-hop negotiation of security for an E2E SL session. In order to reduce overhead, simplify and obviate the need for an originating node to be directly involved in performing the establishment of security associations for each hop of a hop-by-hop SL session, we introduce the notion of a security level. The security level is a mapping of a security capability (level of security achievable or security required to match a risk level), to a specific security association tailored to the capability of two communication nodes. e.g. to adjacent hop nodes.

Security Association

A SA is a relationship between two or more entities that describes how the entities will utilize security services to communicate securely. This relationship is represented by a set of information that can be considered a contract between the entities. The information is agreed upon and shared between the entities. The existence of this relationship, represented by the information, is what provides the agreed upon security information needed by entities to securely interoperate. All entities can adhere to the SA for secure communications.

Security associations support different encryption algorithms, authentication mechanisms, and key establishment algorithms and security protocols. The attributes specified for a SA include, but are not limited to:

Authentication and key agreement algorithm, mechanism or protocol

Integrity and/or confidentiality protection algorithm

Cryptographic algorithm

Algorithm mode (e.g. integrity protection, encryption etc)

Key length

Initialization parameters for authentication and key generation

Data protection time period (e.g. time after which confidentiality or integrity protection of the data may be relaxed)

The security services offered in an IoT service setting depend on the individual node capabilities, network capabilities and mutually shared capabilities. In order to provide an overall E2E security, the SA for each hop, of a hop-by-hop communications session, are established through a set of SA negotiation message exchanges. In an IoT network of nodes, two E2E communicating nodes, involved in a hop-by-hop communication, may present communicating peer nodes with the desired overall security requirements. The subsequent exchange of information between communicating peer nodes provides for the capability to meet the overall E2E security requirements. The objective is to support E2E security in an authenticated and protected manner based on an agreement of a common set of security attributes, i.e. a set of interoperable SAs that meet the overall E2E security requirements.

Security Level based Security Association Establishment

The security level is a means of indirectly specifying the security association attributes between two communicating nodes. It provides a means to abstract the specific algorithms and key sizes etc. required to achieve a required level of protection of the data communicated between two entities. The security level may be specified as levels from say no security, low, medium or high or through numeric representation such as for example 0 for no security and 1 being the lowest and 10 being the highest level of security. Given the nature of the hop-by-hop communications and the breadth and variety of capabilities individual IoT devices may have, the ability to abstract the specific security association attributes for a particular pair of communicating nodes provides a very simple yet powerful way of establishing an E2E security for a multi-hop communications system. Table 1 provides a very simple, non-exhaustive, illustrative example of how the security level may be used to establish the specific cryptographic attributes of a security association for a pair of communicating nodes. Indicated in the table are the encryption algorithms and key lengths which progressively increase the security. Although symmetric algorithms are illustrated, asymmetric algorithms which may use different key lengths may also be included as well as additional SA attributes, which cover the entire specification of a SA in a similar progressive manner including but not limited to symmetric/asymmetric cryptographic algorithms, authentication algorithms or protocols, integrity or confidentiality protection algorithms etc.

TABLE 1

Example of Possible Mappings of Security Level to SA Attributes

| Security Level | Encryption Algorithm | Key Length |
| --- | --- | --- |
| None | None | N/A |
| Low | DES | 56 bits |
| ↓ | | |
| ↓ | 3-DES | 112 bits |
| Medium | 3-DES | 168 bits |
| ↓ | ↓ | ↓ |
| ↓ | AES | 192 bits |
| High | AES | 256 bits |

Individual nodes involved in an E2E SL session over a hop-by-hop connection may have very different capabilities and an initiation node may wish to influence the security established between any two adjacent hop nodes. Rather than negotiate and specify the hop security on a hop-by-hop basis, the use of a security level enables the initiation node to simply specify the security level, for consideration by all hop nodes, which is then mapped to the set of SA attributes for any two adjacent hop nodes based on their individual capabilities. Adjacent hop nodes may have their own specific shared capabilities and which are mapped to a security level table similar to Table 1 but with all fields of a SA specified. For example Table 2 illustrates further how the SA attributes may be associated with the capabilities of a device and the specific algorithms which may be used for integrity protection and for ciphering. The initiation node may have capabilities to access the mapping tables from security level to SA attributes. These tables may be provided by trusted third parties or securely distributed by the nodes. The process of mapping SA attributes such as type of authentication and key establishment algorithm used, cryptographic key derivation function etc. can be complex but the resulting tables may be simple to implement by IoT nodes. The tables may have been through an evaluation, either by a third party or through an independent test and certification authority, thus providing the initiation nodes confidence that when a security level is specified it will be interpreted correctly to establish the specific SA attributes tailored for a specific pair of adjacent hop nodes.

| Security Level | Class 0 | Class 1 |
| --- | --- | --- |
| Low | Integrity/Authentication SHA192 Confidentiality SPECK | Integrity/Authentication SHA256 Confidentiality SPECK |
| Med | Integrity/Authentication SHA256 Confidentiality SPECK | Integrity/Authentication SHA-3 Confidentiality CHACHA |
| High | Integrity/Authentication SHA-3 Confidentiality CHACHA | Integrity/Authentication SHA-3 Confidentiality AES |

Description of Use Case Scenarios

Consider the example scenarios described above. In order to meet the security requirements for the various application scenarios, the following procedure may be followed.

The session as described for Example #1 is setup with a medium level of security.

The setup of the session link for Example #2, requires joint use of one of the same hops as the first link for Example #1 and to elevate the security level for this existing link to a high level of security.

The setup of the session link for Example #3 requires joint use of one of the same hops as for Example #1 and for Example #2. The pre-existing security level satisfies the low security requirement and so no change in the security level for the common hop is required.

The session that was setup for Example #2 is torn down and so the security for the common hop for Example #1 and #3 may now be scaled down to reduce burden on the nodes and optimize performance of the system.

Figure 3:
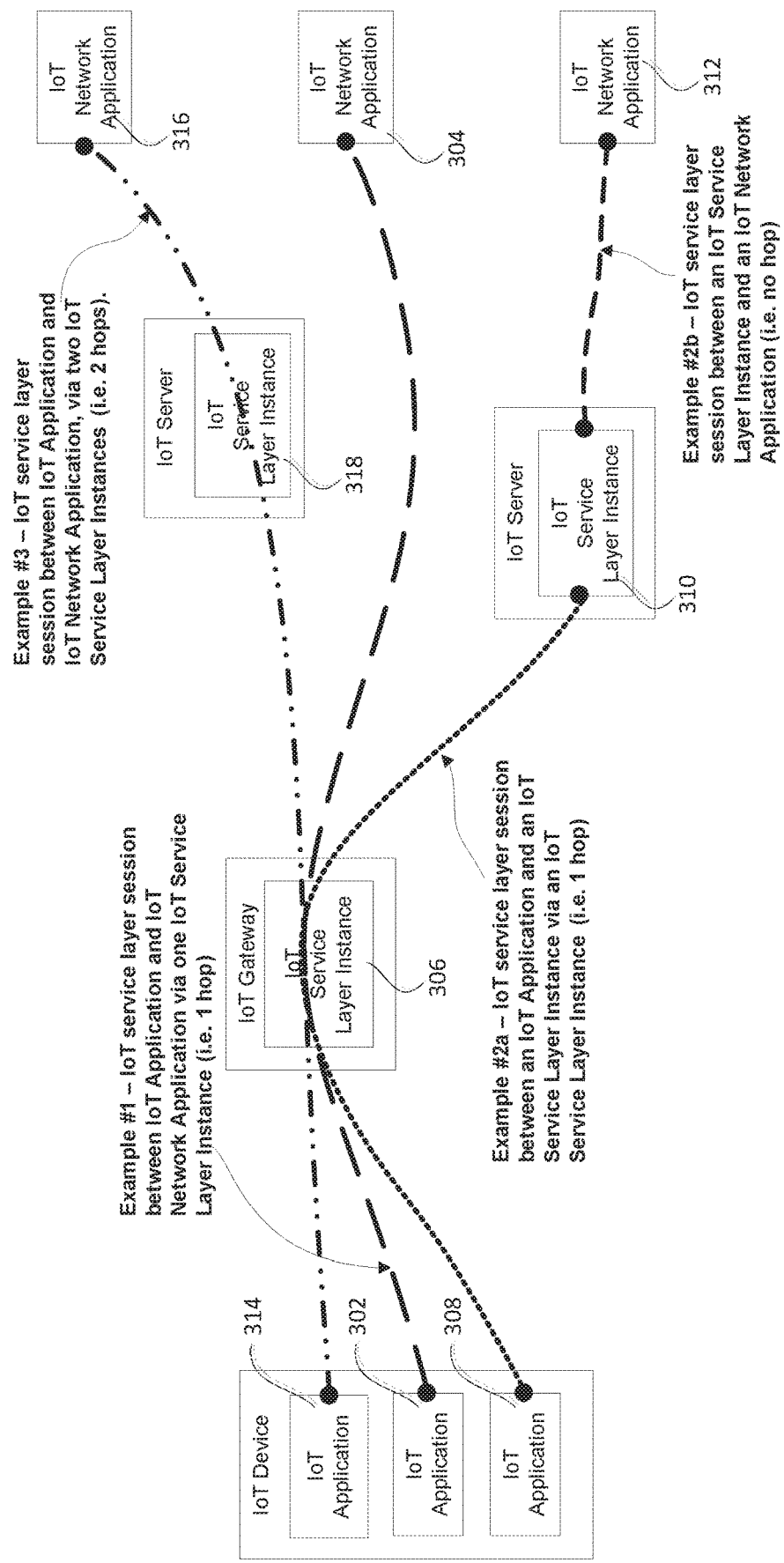
FIG. 3 is a diagram of IoT SL Session Examples.
Figure 4:
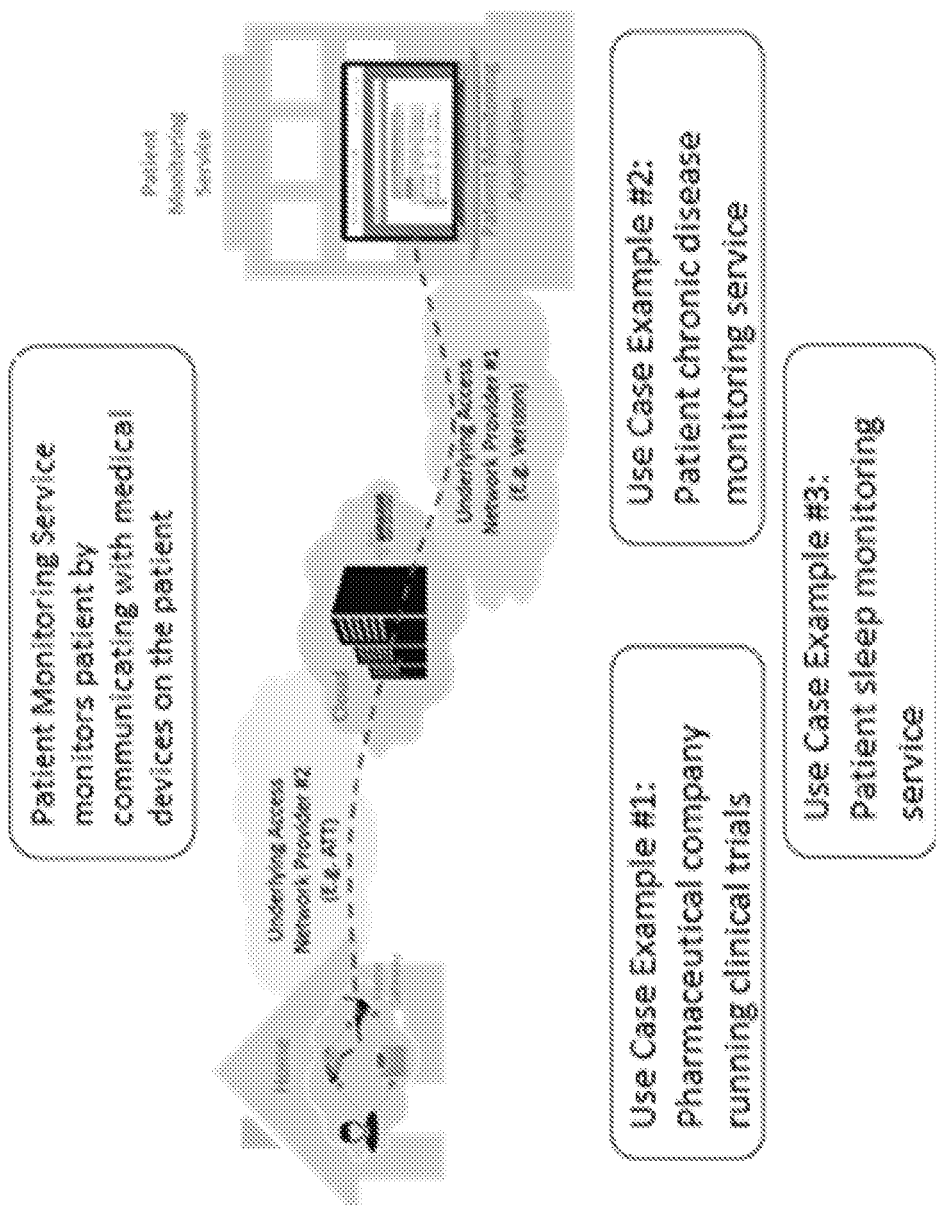
FIG. 4 is a diagram of End-to-End IoT Device Communication Use Case Examples.

An E2E hop-by-hop session may be established in a variety of ways, of which we now describe a couple of approaches with reference to FIG. 3. In the examples we illustrate specification of the security requirements through the previously described lightweight security level approach. However, it is also possible to negotiate and agree on SA attributes directly as may be the case with an AS assisted security establishment procedures.

Hop-by-Hop Propagation of Security Requirements

Figure 6:
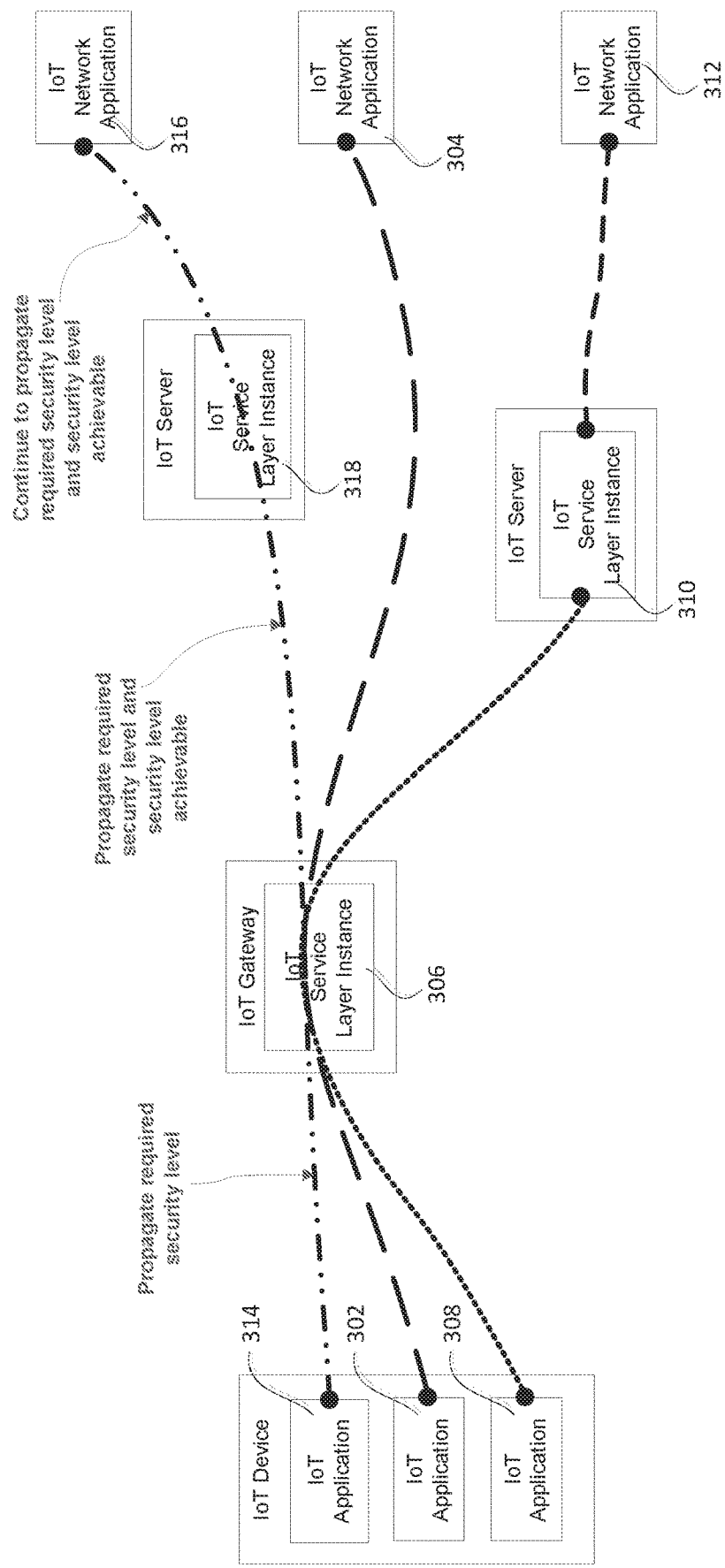
FIG. 6 is a diagram of an IoT SL Session Example using Security Level Propagation.

FIG. 6 shows a diagram where the required security level is propagated by an initiation node from one hop to another. In this case, the security level value is sent from application 314 to SL instance 306 to SL instance 318 and then to application 316. The following sections describe in more detail how overall security is achieved on a hop-by-hop basis.

It is understood that the functionality illustrated in FIG. 6 may be implemented in the form of software (i.e., computer-executable instructions) stored in a memory of, and executing on a processor of, a node of an M2M network (e.g., a server, gateway, device, or other computer system), such as one of those illustrated in FIG. 21C or 21D described below.

Establishment of Security for a Session

The security requirements for two E2E communicating nodes, e.g. Example #1, is established through propagation of security requirements from one node to another in a trickle down hop-by-hop manner. The initiation node may also influence some aspects of setting up a SA by supplying freshness parameters such as nonces, sequence counters, parameters to bind hop-by-hop SAs etc. which are then used to establish the SA for each hop of an E2E communications session. Note that several alternative hop-by-hop communications paths may be evaluated in order to achieve the required security.

A Network Application 316 wishes to securely receive data from an Application 314 on an M2M device.

The Application 314 on the M2M device and/or Network Application 316 wishes to ensure that the security of the data transported over each hop is of an adequate minimum security level.

There are several hops involved in transporting the data from the Application 314 on the M2M device to the Network Application 316.

Messages are delivered on a hop-by-hop basis based on a hop node discovery (based on the end delivery node, Network Application address) and relay mechanism.

The Application 314 on the M2M device provides the next hop node 306 in a chain with the destination address and information on the required security level.

The receiving node 306 performs an assessment of the security capability achievable for the next hop of a connection. If after all alternative communications paths have been evaluated, the security requirements cannot be met then the best security achievable is determined.

The hop security is negotiated and established. The node maintains parameters such as session ID, required SA, requesting node ID, etc. relating to all established hops that it is supporting.

A secure link is established to the next hop and the originating node's (Application on the M2M device), security requirements relayed to the next node in the hop.

This process is repeated until eventually, the Network Application 316 is reached.

Following setup of the E2E session, the Network Application 316 and Application 314 on the M2M device are each provided with the achieved best hop security.

Establishment of Security for a Session Sharing a Hop

The security requirements for the two E2E communicating nodes e.g. Example #2 and #3 is established through propagation of security requirements from one node to another in a trickle down hop-by-hop manner similar to that described for Example #1. However, in the case of establishing the session, an existing hop security is being re-used so the following process is followed:

When a receiving node performs an assessment of the security capability required by a node, for a new communications session, if the requested security level involves using an existing connection then the current security level is compared to the required security level.

If the required security level is met by the existing SA then no further security setup is required and the session ID and SA information is added to the list of connections for the hop.

If the required security level is not met by the existing SA then the security for the hop is upgraded to reflect the required security level.

If the required security level is not possible then the hop is upgraded to reflect the achievable security level.

Upon successful setup of the hop, the session ID for the new session and SA is added to the list of connections for the hop and the established SA is relayed back to the requesting node.

The requesting node, upon receiving the achieved security level, then relays to the next node in the hop-by-hop chain, the best achieved hop security level.

Following setup of the E2E session, the Network Application and Application on the M2M device are each provided with the achieved security which meet the required security or may be the achieved best hop security. If the initiation node is not satisfied with the security achievable then it may choose to report a session establishment failure to the terminating node, limit service, or negotiate other forms of protection such as over-the-top application layer security etc.

Security Re-evaluation when a Session is Torn Down

When a hop-by-hop session is torn down or terminated, the security requirement imposed on a hop, by the session being terminated, is no longer required. The node involved in providing the hop security re-evaluates the current SA and if required may reduce the SA for the hop based on the needs of the existing connections. If there is a change to the SA then following setup of the hop SA, the existing E2E communication end nodes, involved in a session with the node are notified of the new SA.

Authentication Server Assisted Hop-by-Hop Security

Figure 7:
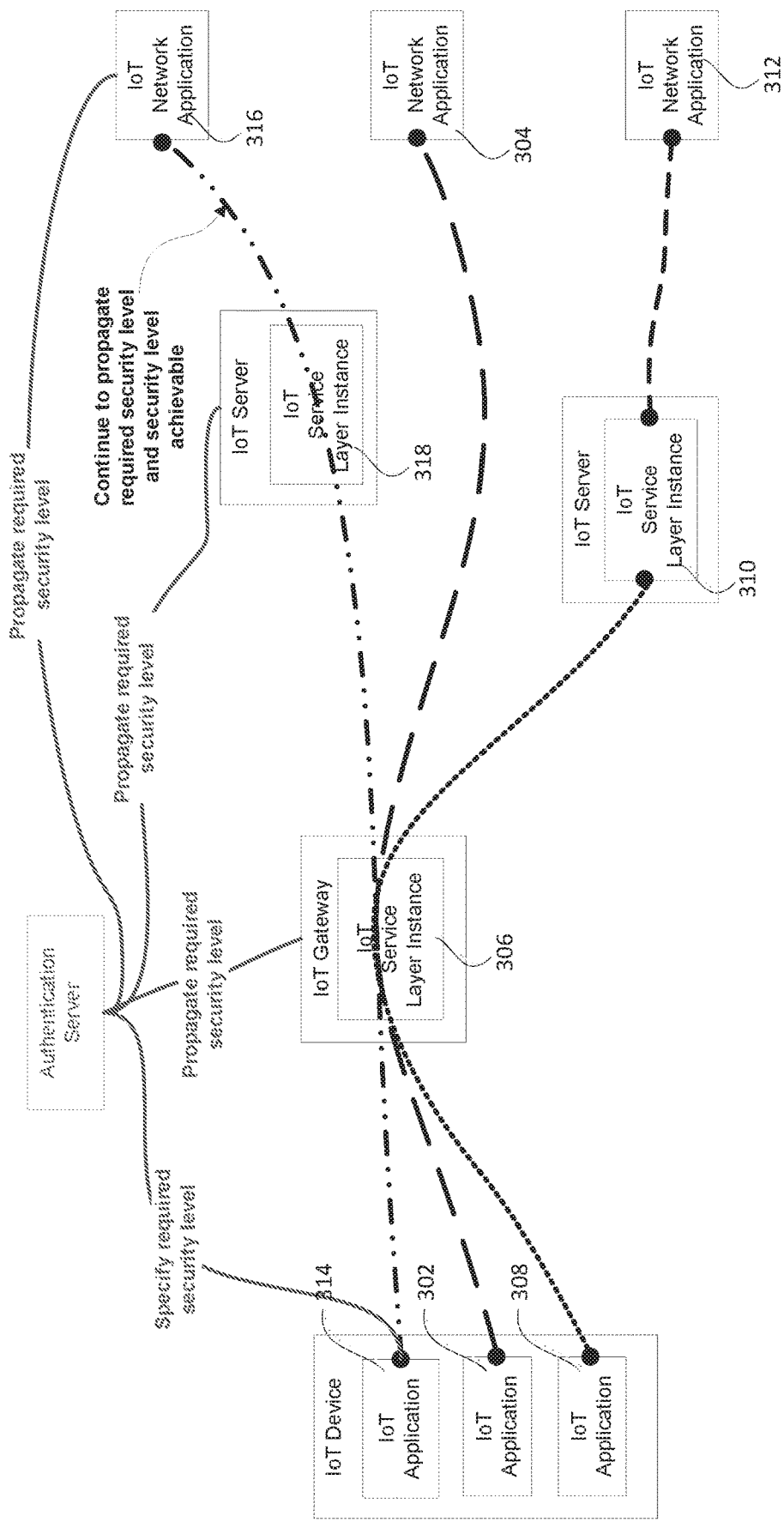

FIG. 7 shows a diagram where the required security level is achieved for one hop to another through the assistance an Authentication Server (AS). The following sections describe in more detail how overall security is achieved on a hop-by-hop basis.

It is understood that the functionality illustrated in FIG. 7 may be implemented in the form of software (i.e., computer-executable instructions) stored in a memory of, and executing on a processor of, a node of an M2M network (e.g., a server, gateway, device, or other computer system), such as one of those illustrated in FIG. 21C or 21D described below.

Establishment of Security for a Session

The security requirements for two E2E communicating nodes, e.g. Example #1, is established through relaying of the security requirements from the Application on the M2M device and/or Network Application to the AS 702. The AS 702 then maintains the session requirements and assists the hop-by-hop nodes to establish individual hop level SAs. The AS 702 may influence all aspects of setting up a SA from negotiation of algorithms to influencing the parameters used in the key derivation algorithms (for example, the master key used to establish the session keys for each hop's security may be derived by the AS) thus achieving control on the security of the overall SA setup process. Note that several alternative hop-by-hop communications paths may be evaluated in order to achieve the required security.

A Network Application 316 wishes to securely receive data from an Application 314 on an M2M device.

The Application 314 on the M2M device and/or Network Application 316 wishes to ensure that the security of the data transported over each hop is of an adequate minimum security level.

There are several hops involved in transporting the data from the Application on the M2M device to the Network Application 316.

Messages are delivered on a hop-by-hop basis based on a hop node discovery (based on the end delivery node, Network Application address) and relay mechanism.

The Application 314 on the M2M device relays the required security to the AS 702 and the desire to establish an E2E session. The AS 702 registers a session ID and the security requirements.

The Application 314 on the M2M device provides the next hop node 306 in a chain with the session ID and session destination address. The hop node 306 determines the reachability path for the session and a suitable next hop.

The hop node 306 and its adjacent hop node 318 communicate with the AS 702 in order to establish a SA.

The AS 702 retrieves the security requirements using the provided session ID and performs an assessment of the security capability achievable, for the hop to be established by the two nodes. If the security requirements cannot be met after all alternative paths have been evaluated then the best achievable security is determined.

The AS 702 and hop nodes 306 and 318 establish a hop SA to include generation of and binding of credentials for the hop. The AS 702 notes the achieved hop SA with the session ID, hop node IDs, required SA, requesting node ID, etc. into a database list relating to all established hops that it is supporting.

This process is repeated until eventually, the Network Application 316 is reached.

Following setup of the E2E session, the Network Application 316 and Application 314 on the M2M device are each provided with the achieved best hop security by the AS 702.

Establishment of Security for a Session Sharing a Hop

The security requirements for the two E2E communicating nodes e.g. Example #2 and #3 is established through propagation of security requirements from the Application on the M2M device and/or Network Application to the AS 702. The AS 702 then assists the hop nodes in establishing the SA on a hop-by-hop basis in a similar manner to that described for Example #1. However, in the case of establishing the session, an existing hop security is being re-used so the following process is followed:

When a receiving node receives a request to setup a hop security for a new communications session, the node reaches out to the AS 702 for assistance.

The AS 702 performs an assessment of the security capability required and compares the requested SA with the existing SA.

If the required SA is
  Met by the existing SA then no further security setup is required and the session ID and SA information is added to the list of existing connections for the hop.
  Not met by the existing SA then the SA for the hop is upgraded to reflect the required SA.
  Not possible then the hop is upgraded to reflect the achievable SA.

If the security is upgraded then the AS 702 assists the hop nodes to establish a higher grade of security. The new connection is added to the list of existing connections for the hop and the established SA is noted at the AS 702.

Following setup of the E2E session, the Network Application and Application on the M2M device are each provided with the achieved security which may be the requested or achieved best hop security.

Security Re-evaluation when a Session is Torn Down

When a hop-by-hop session is torn down or terminated, the security requirement imposed on a hop, by the session being terminated, is no longer required. The AS 702 re-evaluates the hop security for the supported sessions and if required may reduce the SA for the hop based on the needs of the existing sessions/connections. If there is a change to the SA then following setup of the hop SA, the E2E communicating nodes involved in existing sessions sharing the connection are notified of the new SA.

IoT System for Management of E2E Security

Figure 8:
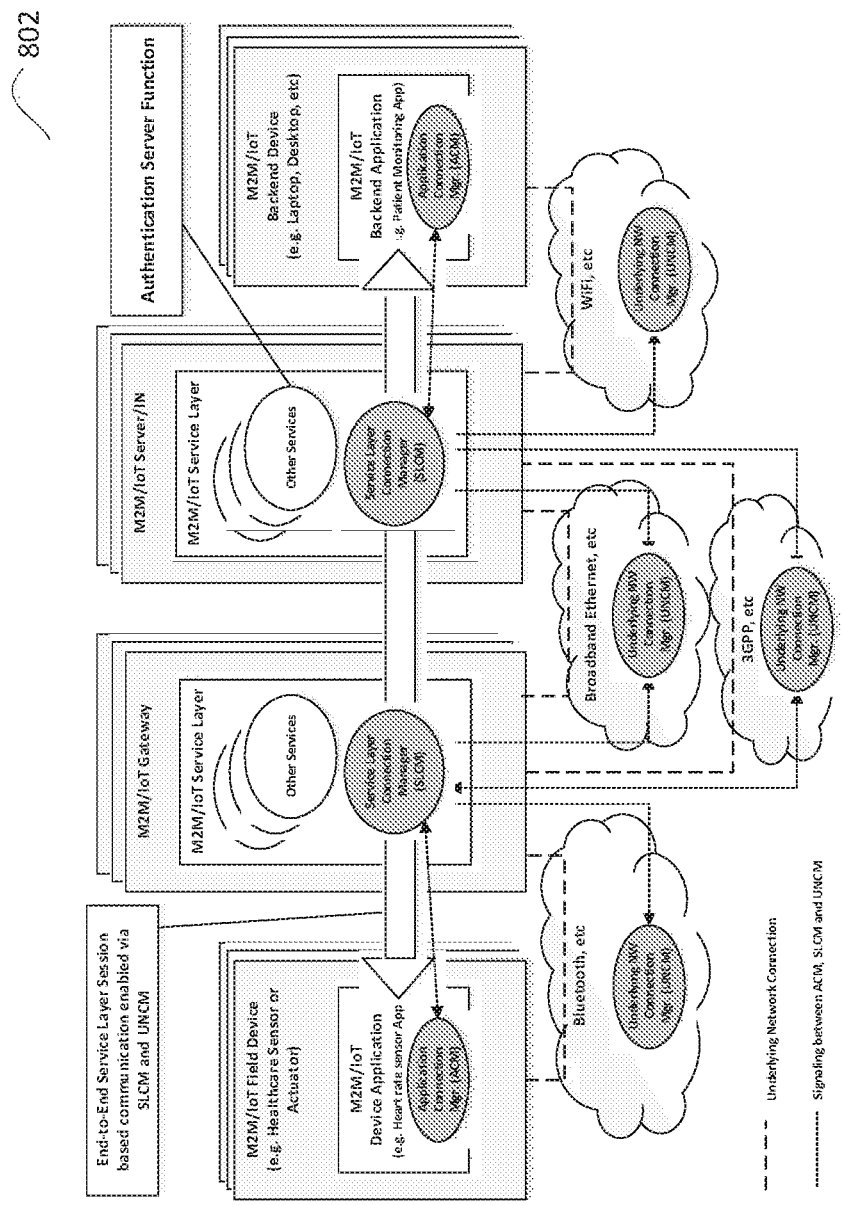
FIG. 8 is a diagram of an IoT System for Management of E2E Security.

FIG. 8 shows a system architecture 802 to support mechanisms to manage IoT SL session security in an end-to-end manner. Such a system can be used to support use cases such as the ones described earlier where an originating node may specify the security requirements for an E2E SL session, which may include parameters such as those described for the required security association (security level); authentication and key exchange mechanism or protocol; cryptographic algorithm; algorithm mode; key length; and initialization parameters for authentication and key generation. An IoT system consists of servers, gateways, and devices interconnected to one another via a diverse combination of local area and wide area networks (e.g. 3GPP, Ethernet, WiFi, etc). Hosted on the servers and gateways are instances of IoT SLs which may provide security authentication service such as an AS 702 function which facilitates establishment of the SL security for individual hops of an E2E SL session. For example, the AS 702 may help to determine the capabilities of two adjacent communicating nodes and help establish a secure SL connection which may include authentication and derivation of the session key. Hosted on the devices in the field as well as the devices in the backend are IoT applications that require communication with one another. For example, end-to-end communication between a patient's IoT sensor/actuator and a backend patient monitoring application as described earlier.

Authentication Server Function

The AS function enables applications and service layer entities to specify their E2E SL session security requirements to the SL. This would include an application specifying the required security in terms of specific parameters and/or desired level of security; e.g. no security, low, medium, high etc.

Using this information, the AS function can support assessing the security requirements against the collective set of SL registrants (e.g. applications) and connected service nodes and perform security configuration of the SL instances such that the E2E security requirements for all its registrants are satisfied. In order to do this, the AS function may perform on-the-fly adjustment of the security level in order to achieve the desired E2E security by influencing the security for each of the SL hops in an E2E SL session's communication path.

It is understood that the functionality illustrated in FIG. 8 may be implemented in the form of software (i.e., computer-executable instructions) stored in a memory of, and executing on a processor of, a node of an M2M network (e.g., a server, gateway, device, or other computer system), such as one of those illustrated in FIG. 21C or 21D described below.

Procedure for E2E Security Management

Figure 9:
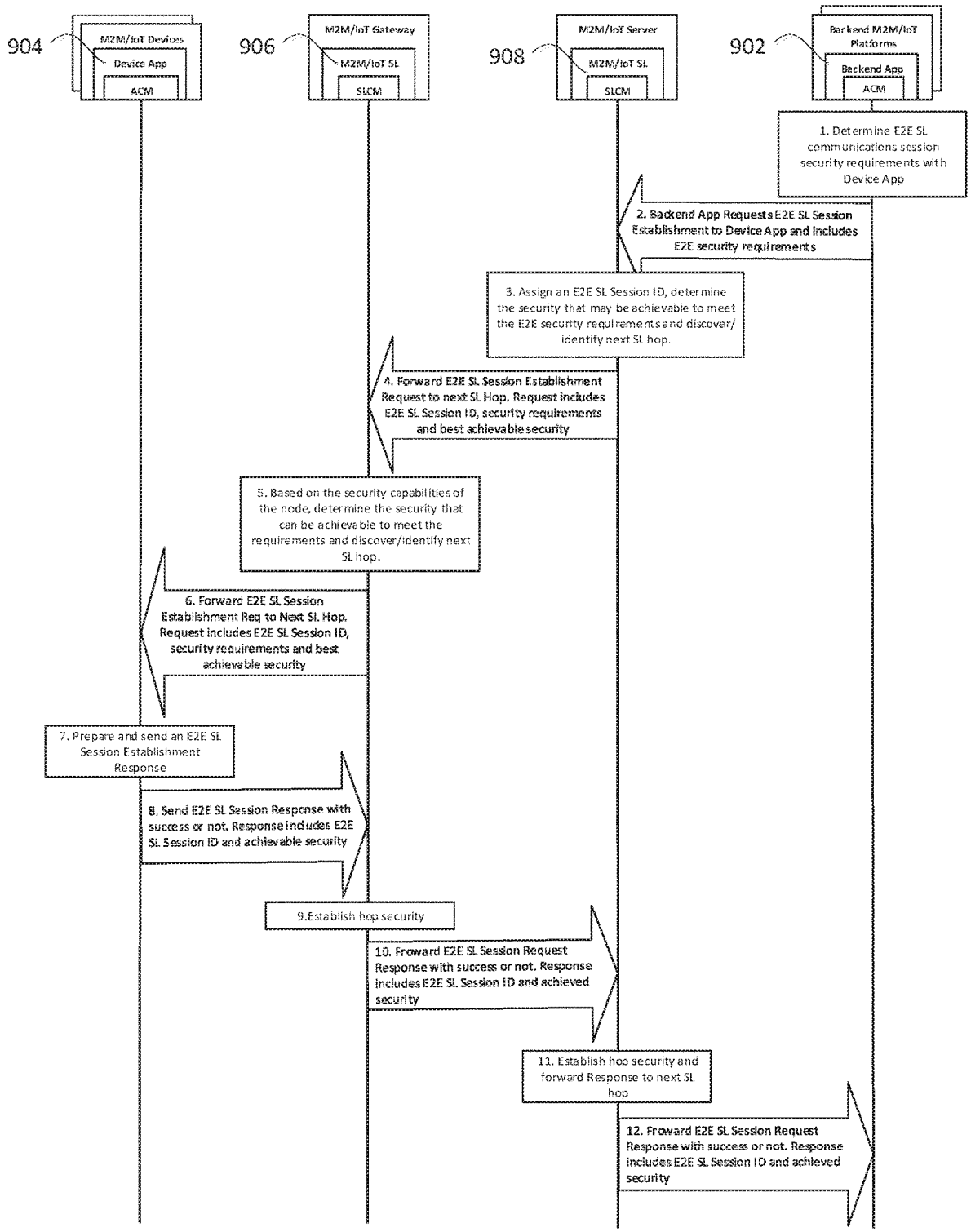
FIG. 9 is a diagram of an IoT E2E Security Management Procedure.

FIG. 9 shows a system level procedural embodiment that demonstrates how the E2E SL session security may be established through management of the individual hop-by-hop security between IoT devices, gateways, and servers in a coordinated end-to-end manner.

There are two basic methods of establishing a secure SL session. The first method is performed directly between two adjacent communicating nodes, forming part of an E2E communication at the SL, with the aid of the Service Layer Connection Manager (SLCM). The second method is performed though support from a common entity such as the AS 702, which assists two adjacent communicating nodes. The descriptions that follow are generic and assume any one of these methods may be utilized to establish an individual hop security, which forms part of an E2E SL session.

Note that while the description that follows is for a complete E2E scenario, there may be instances where the end device is a small footprint, low complexity with limited capabilities and power constraints. In these cases, the device may not have the capability to provide any security or only limited security. Security for such a scenario may be provisioned by the controlling Gateway that the device is communicating with and the Gateway may then act as a proxy for the device and in effect act as the coordinating end point for the E2E communication.

Initiate Session Establishment Procedure: A backend application discovers an application on a device, which can deliver some information it desires and so the backend application triggers an E2E SL Session Establishment Request to the device.

In Step 1 of FIG. 9, a registered backend application 902 determines that it wishes to communicate with a device application 904 via IoT SL nodes 906 and 908. Based on use case requirements, the backend application 902 determines the E2E security requirements between itself and the targeted device application(s).

In Step 2 of FIG. 9, the backend application 902 sends an E2E SL Session Establishment or Modification Request to the SL 908 hosted on its serving IoT server. The request may include an E2E SL Session ID and an indication of the required security level. The step may also include the establishment of a Hop Connection ID.

In Step 3 of FIG. 9, the SLCM function affiliated with the SL 908 hosted on the IoT server determines whether or not the E2E SL session security may be met. The SLCM also derives a unique E2E SL Session ID if one does not already exist or if an E2E SL session ID was not included in the request and the next hop is discovered/identified. The SLCM may use the security requirement information to determine the best next hop.

In Step 4 of FIG. 9, the E2E SL Session Establishment Request is forwarded to the identified hop 906, i.e. the IoT gateway herein. The request may include an E2E SL Session ID and an indication of the required security level. The step may also include the establishment of a Hop Connection ID.

In Step 5 of FIG. 9, the SLCM function affiliated with the SL hosted on the IoT gateway determines whether or not the E2E SL session security may be met. The SLCM discovers/identifies the device application on a terminal node.

In Step 6 of FIG. 9, the E2E SL Session Establishment Request is forwarded to the device application 904. The request may also include a Hop Connection ID.

In Step 7 of FIG. 9, the device application 904 on the termination node has been reached. The device application on the termination node prepares and sends an E2E SL Session Establishment Response indicating success or not. The request may include an E2E SL Session ID and an indication of the achievable security level.

In Step 8 of FIG. 9, the Response includes the E2E Session ID and required security (based on the best achievable security). The response may also include a Hop Connection ID.

In Step 9 of FIG. 9, The SLCM function on the gateway 906 establishes the hop security based on the best achievable security information from the hop-by-hop security capability propagation.

In Step 10 of FIG. 9, the E2E SL Session Establishment Response is forwarded from gateway SLCM to the server SLCM with the corresponding Session ID and required security. The response may also include a Hop Connection ID.

In Step 11 of FIG. 9, the SLCM function on the server 908 establishes the hop security based on the best required security.

In Step 12 of FIG. 9, the E2E SL Session Establishment Response is forwarded from server SLCM to the initiation backend application 902 together with the E2E Session ID and achieved (required) security. The response may also include a Hop Connection ID.

Figure 21A:
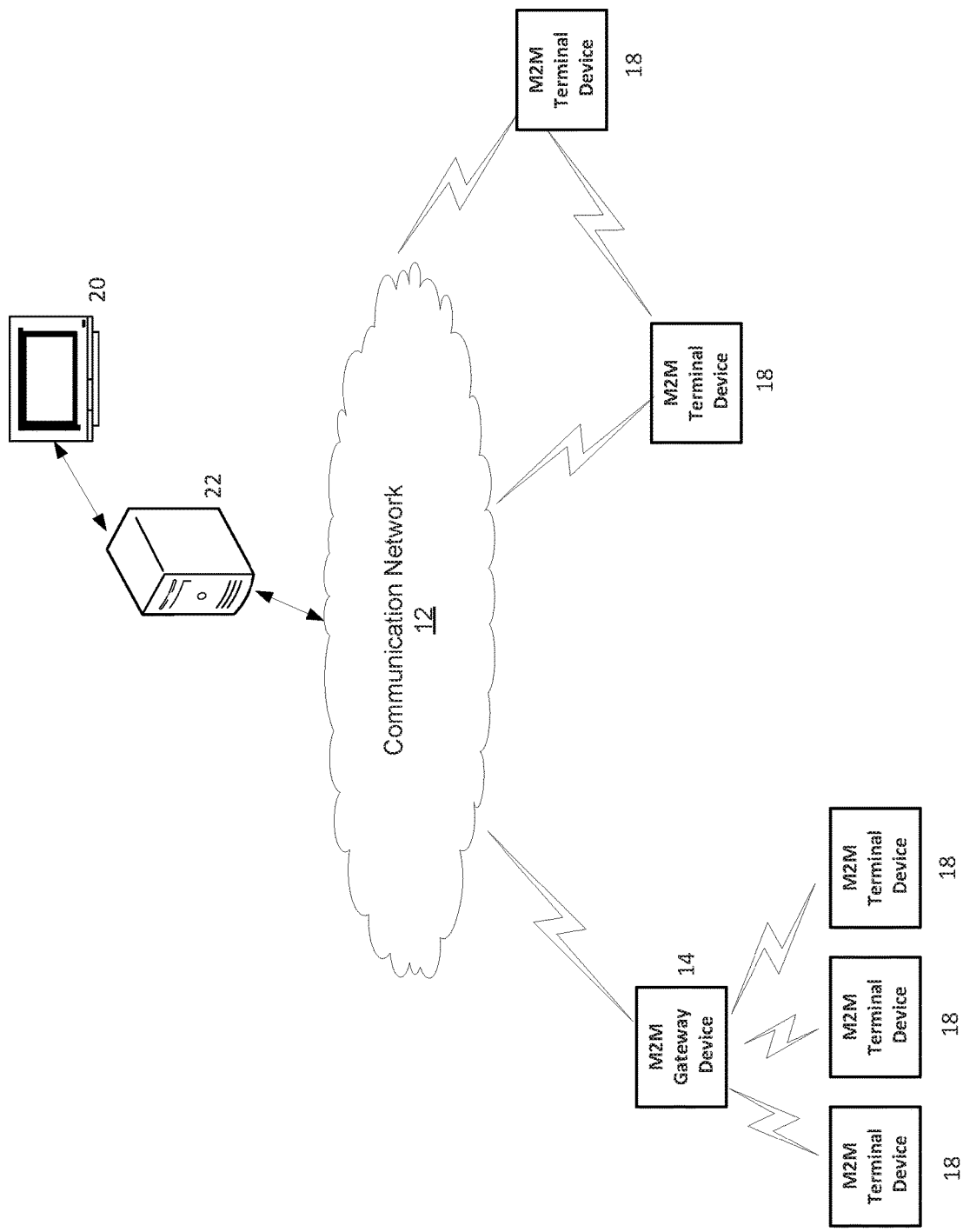
FIG. 21A is a diagram of a M2M/IoT/WoT communication system that includes a communication network.
Figure 21B:
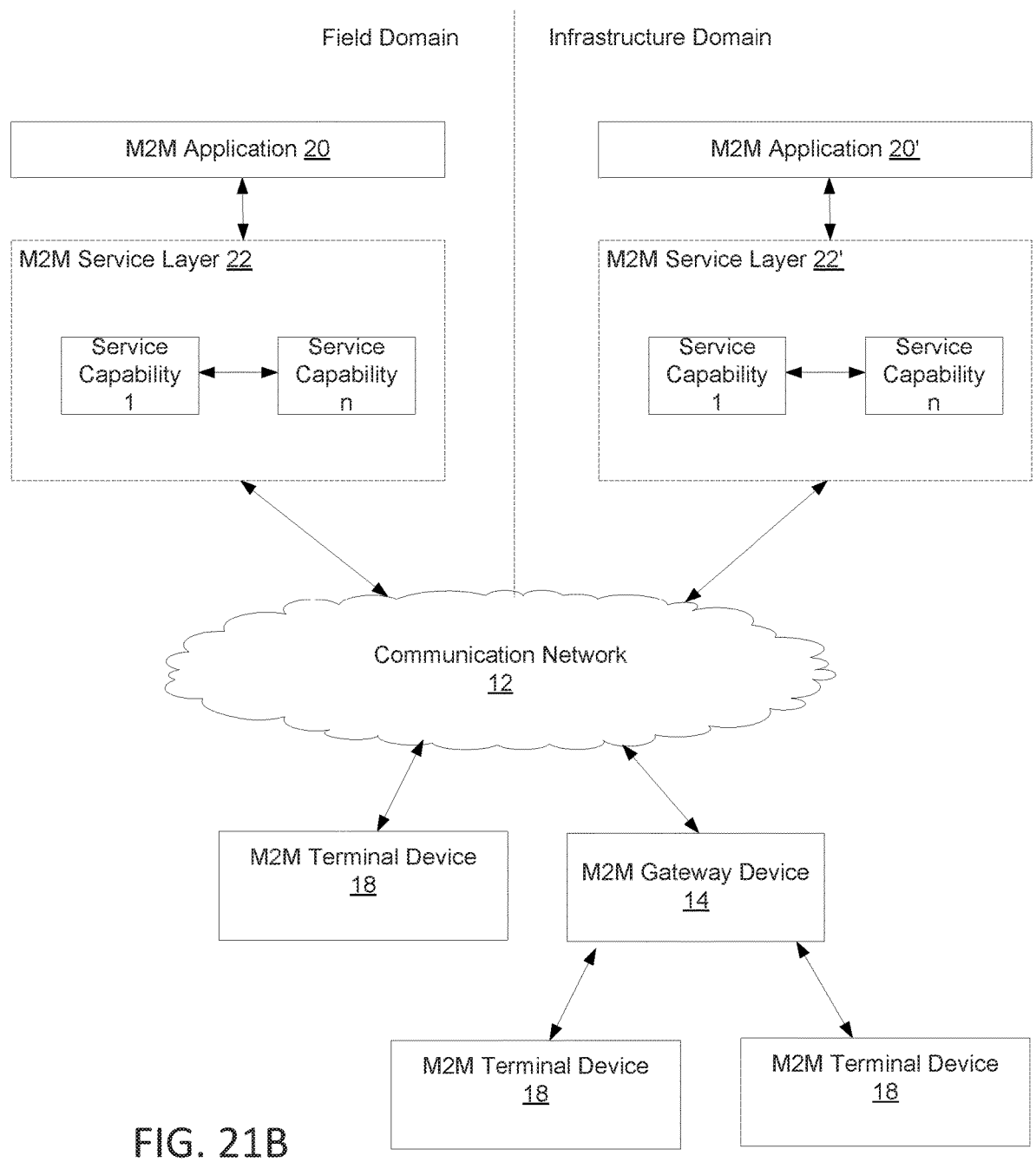
FIG. 21B is a diagram of an illustrated M2M service layer in the field domain that provides services for the M2M application, M2M gateway devices, and M2M terminal devices and the communication network.
Figure 21C:
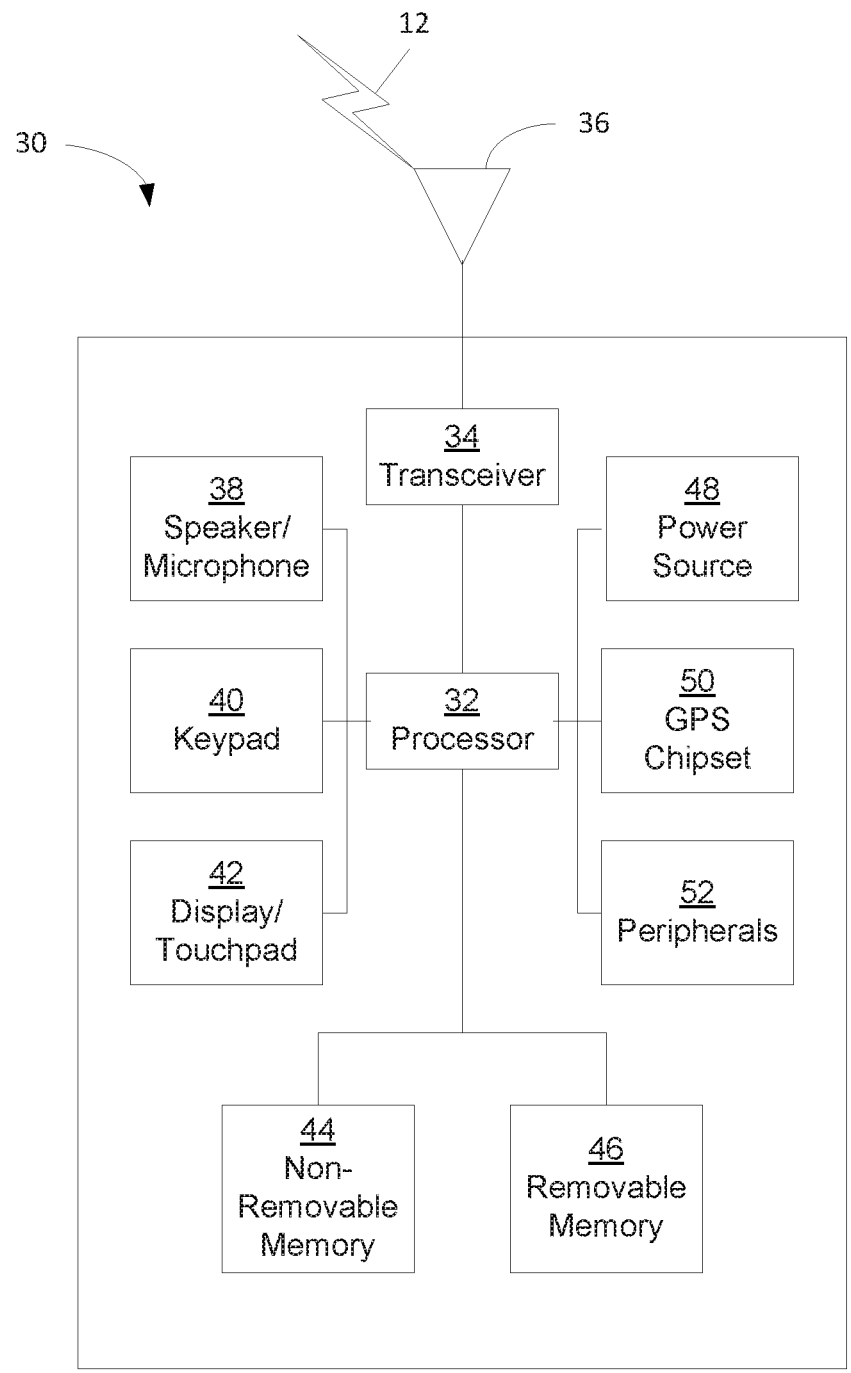
FIG. 21C is a diagram of an exemplary device that may be used to implement any of the network nodes described herein.
Figure 21D:
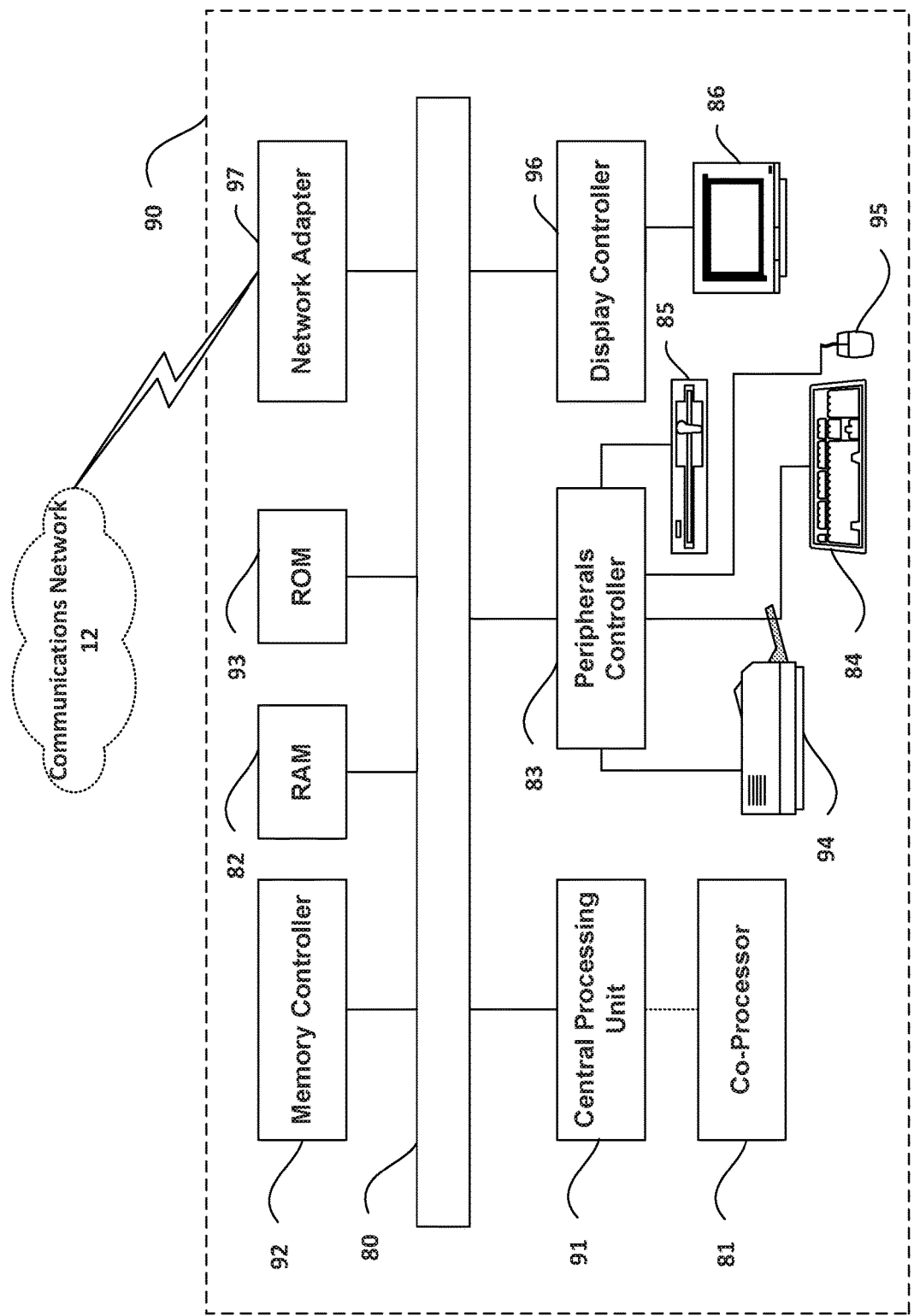
FIG. 21D is a block diagram of a computer system or server that may be used to implement any of the network nodes described herein.

It is understood that the entities performing the steps illustrated in FIG. 9 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 9 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 9. It is also understood that any transmitting and receiving steps illustrated in FIG. 9 may be performed by communication circuitry of the node under control of the processor of the node and the computer-executable instructions (e.g., software) that it executes.

E2E SL Session Security Information

Table 3 illustrates exemplary parameters which determine the security for an individual SL session. The security level is an abstraction to specific security association attributes for a node, which may be different depending upon the capabilities for an individual node.

TABLE 3

SL Session E2E Security Information

| SL Session E2E Security Related Informational Element | Description |
| --- | --- |
| Required Security Level for an E2E SL | The required E2E SL session communication security level as specified by the SL session initiation endpoint. This E2E security level defines the required security for each communication hop for a hop-by-hop SL session. This security required may be given in abstract terms as a security level (e.g. LOW, MED, or HIGH) as previously discussed which could then be converted to specific security association parameters. Alternatively, the security required may be negotiated/given in terms of a specific type of |

TABLE 3-continued

SL Session E2E Security Information

| SL Session E2E Security Related Informational Element | Description |
|---|---|
| | security association (e.g. authentication algorithm, key length etc.). |
| Authentication and key exchange mechanism or protocol | The authentication and key agreement protocol or algorithm to be used. e.g. (D)TLS, HTTPS etc. |
| Cryptographic algorithm | The cryptographic algorithm to be used to derive parameters and session keys. e.g. DES, 3-DES, AES, RSA etc. |
| Algorithm mode | The mode of the algorithm. e.g. hashing for integrity protection, asymmetric algorithm for ciphering (for encryption or decryption) or symmetric algorithm for ciphering (encryption/decryption). |
| Key length | The length of the key to be used for the cryptographic algorithm. |
| Initialization parameters for authentication and key generation | Parameters used to initialize the key generation algorithms and/or derive parameters used in the authentication and key exchange mechanism or protocol. e.g. nonces, seed values, hop security binding parameters etc. |

Methods to Manage E2E Security for a Session

Methods to Manage Establishment of Security for a Session

Figure 10:
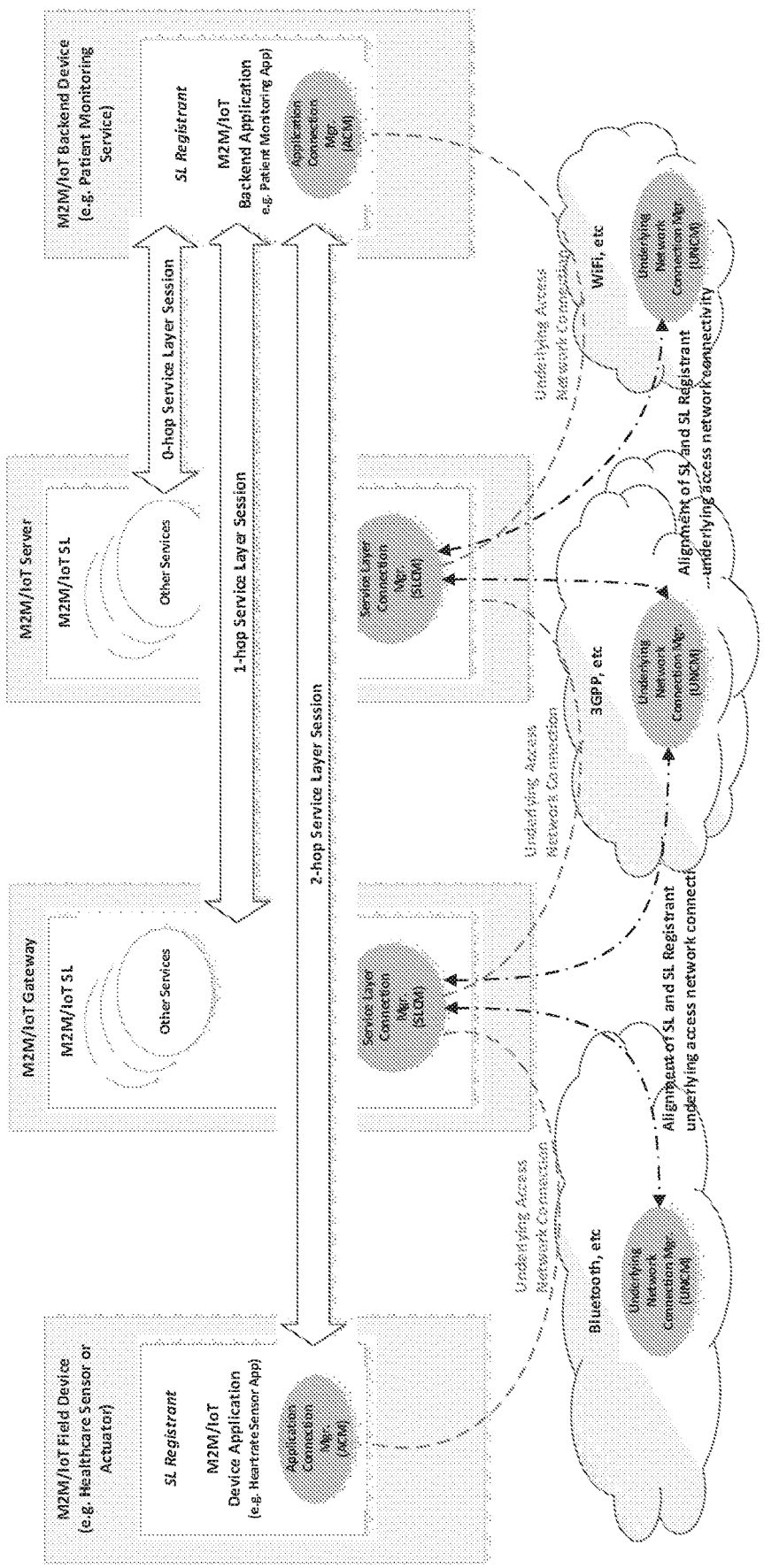
FIG. 10 is a diagram of an E2E SL Session Example.

FIG. 10 illustrates some typical hop-by-hop SL sessions over some example underlying networks, which support E2E communications for an IoT network.

It is understood that the functionality illustrated in FIG. 10 may be implemented in the form of software (i.e., computer-executable instructions) stored in a memory of, and executing on a processor of, a node of an M2M network (e.g., a server, gateway, device, or other computer system), such as one of those illustrated in FIG. 21C or 21D described below.

Figures 11A, 11B:
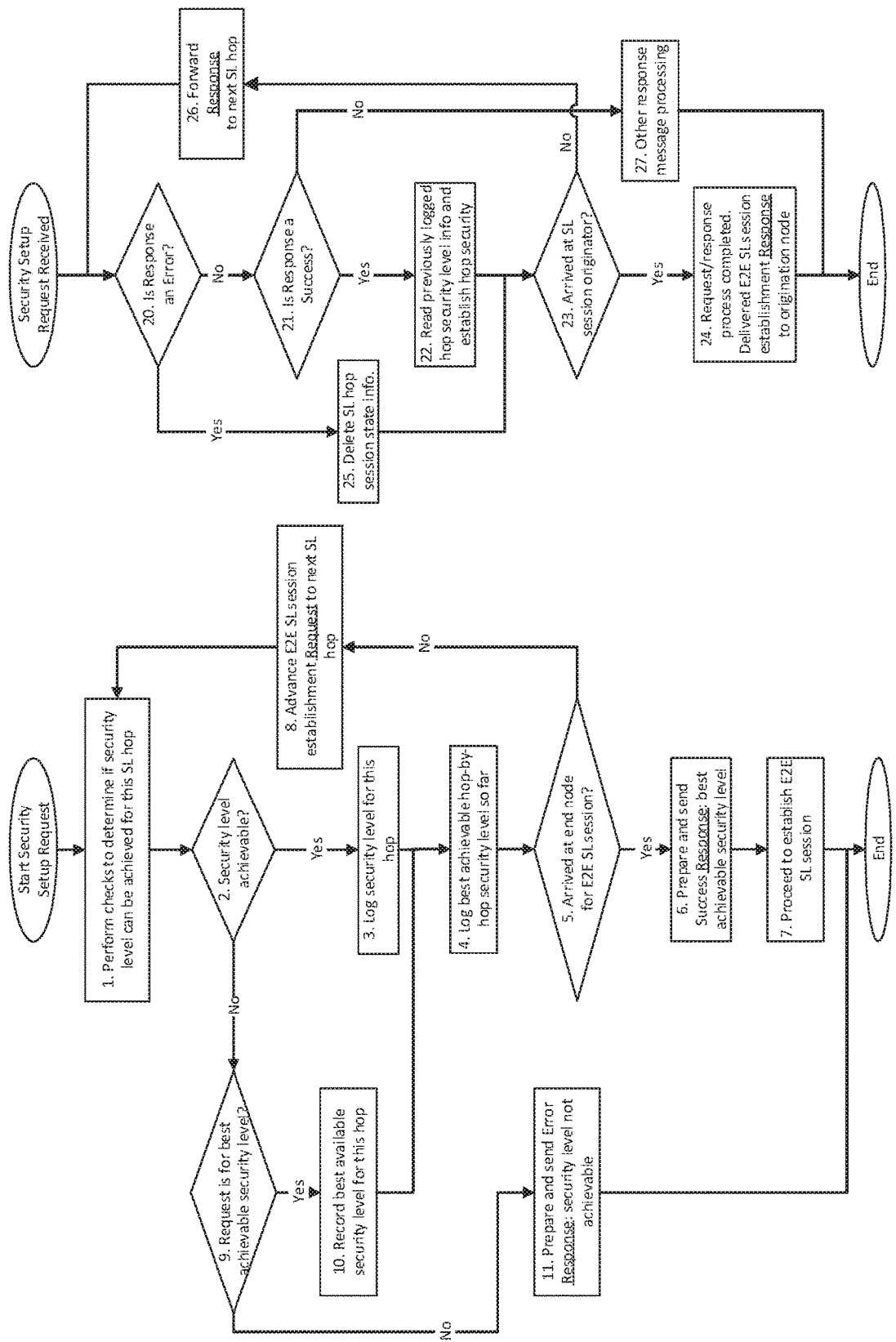
FIGS. 11A-B are diagrams of a method to Manage Establishment of Security for a Session.

A method for managing security during the establishment of an E2E SL session is outlined in FIGS. 11A-B.

A pre-requisite to the procedure shown is a SL registrant (e.g. a backend application 902) first generates a request for the establishment of a SL session between itself and a target SL session endpoint (e.g. device application 904). In the request, a SL registrant can specify its security requirements for the E2E SL session by including information in the request that specifies the desired security level as outlined in Table 3 and whether the requirement has to be met or best efforts may be acceptable.

The point at which the E2E SL Session Establishment Request is received by the SL registrant's local SL, is the point at which the procedure defined in FIGS. 11 A-B starts. This procedure is used to process the E2E SL Session Establishment Request as it is propagated towards the target SL session endpoint as well as the corresponding response as it flows back towards the SL registrant that originated the request.

The detailed steps of the procedure are defined below.

Start Request Processing—A Receiver (i.e. an intermediate SL instance or the targeted SL session endpoint) detects an incoming request and checks whether or not it is a SL Session Establishment Request. This check is performed by analyzing header information in the SL message which indicates the SL message type. If it is a SL Session Establishment Request it proceeds to step 1.

In Step 1 of FIG. 11A, a check is performed to determine if the requested security level between this node and its neighboring SL session hop partner may be achieved.

In Step 2 of FIG. 11A, if the security level is achievable then proceed to Step 3 of FIG. 11A. If not then proceed to Step 9 of FIG. 11A.

In Step 3 of FIG. 11A, the security level which meets the requirement from the originating node is logged for later retrieval and setup of the hop security.

In Step 4 of FIG. 11A, the best achieved security level based on what can be achieve from the evaluation of earlier hops is logged for later reference when setting up the E2E hop-by-hop security.

In Step 5 of FIG. 11A, if the Request message has not arrived at the E2E destination node then go to Step 8 of FIG. 11A to perform checks for the next hop. If at the destination node then go to Step 6 of FIG. 11A.

In Step 6 of FIG. 11A, prepare a SL session establishment response message indicating that the E2E hop-by-hop security can be established and with the achievable security level. The destination SL session endpoint, upon receiving the request can perform actions such as, but not limited to, verifying that the initiation node endpoint has the proper permissions to establish an E2E SL session with the destination node. The response may contain information such as but not limited to:

The E2E SL Session ID
The Hop Connection ID
A successful response code
The best achievable security level This response is then sent back to the Receiver's same neighboring SL session hop partner which it received the request from through the chain back to the initiation node.

In Step 7 of FIG. 11A, proceed to setup the E2E hop-by-hop security during traversal of the Response message back to the initiation end point, as determined from the earlier evaluation.

In Step 8 of FIG. 11A, propagate the E2E SL session Request to the next hop and continue at Step 1 of FIG. 11A.

In Step 9 of FIG. 11A, a check is carried out to determine if the initiation node has requested best efforts security setup. If so the proceed to Step 10 of FIG. 11A. If not then proceed to Step 11 of FIG. 11A.

In Step 10 of FIG. 11A, the best achievable security level is determined for the node and recorded for later retrieval and setup of the hop security.

In Step 11 of FIG. 11A, the hop node is not able to successfully process the E2E SL Session Establishment request with the required security level. An error response is prepared for transmission back to the initiation node with that same neighboring SL session hop partner which it received the request from.

Start Response Processing—Upon receiving a response to the E2E SL Session Establishment request, the response message is sent back through the same path used to establish a path to the termination node.

In Step 20 of FIG. 11B, upon receiving this response, the neighboring SL session hop partner can process the response using this same procedure (see Step 11 of FIG. 11A).

In Step 21 of FIG. 11B, if the response is a success then proceed to Step 22 of FIG. 11B. If not then proceed to Step 27 of FIG. 11B.

In Step 22 of FIG. 11B, the hop security level information which had been evaluated earlier is compared with the achievable security level information and the security for a hop link is established using the best achievable security level information.

In Step 23 of FIG. 11B, if the Response message has not arrived at the E2E initiation node then go to Step 26 of FIG.

11B to perform checks for the next hop. If at the destination node then go to Step 24 of FIG. 11B.

In Step 24 of FIG. 11B, the E2E SL Session and the Request/Response is deemed to have been successfully established and the E2E SL session setup response message delivered to the initiation node.

In Step 25 of FIG. 11B, an error has occurred so the receiving hop node deletes/removes any SL session state and any other configuration information which may be used to setup for the E2E SL Session Establishment processing. If there is an error at any hop on the security session path, the security establishment will fail and the error propagated to the initiation node.

In Step 26 of FIG. 11B, propagate the E2E SL session Request to the next hop and continue at Step 20 of FIG. 11B.

In Step 27 of FIG. 11B, the response message received is other than an error or success message so pass on to message parsing routine.

It is understood that the entities performing the steps illustrated in FIGS. 11A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIGS. 11A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIGS. 11A-B. It is also understood that any transmitting and receiving steps illustrated in FIGS. 11A-B may be performed by communication circuitry of the node under control of the processor of the node and the computer-executable instructions (e.g., software) that it executes.

Methods to Manage Security for a Session Sharing a Hop

Figures 12A, 12B:
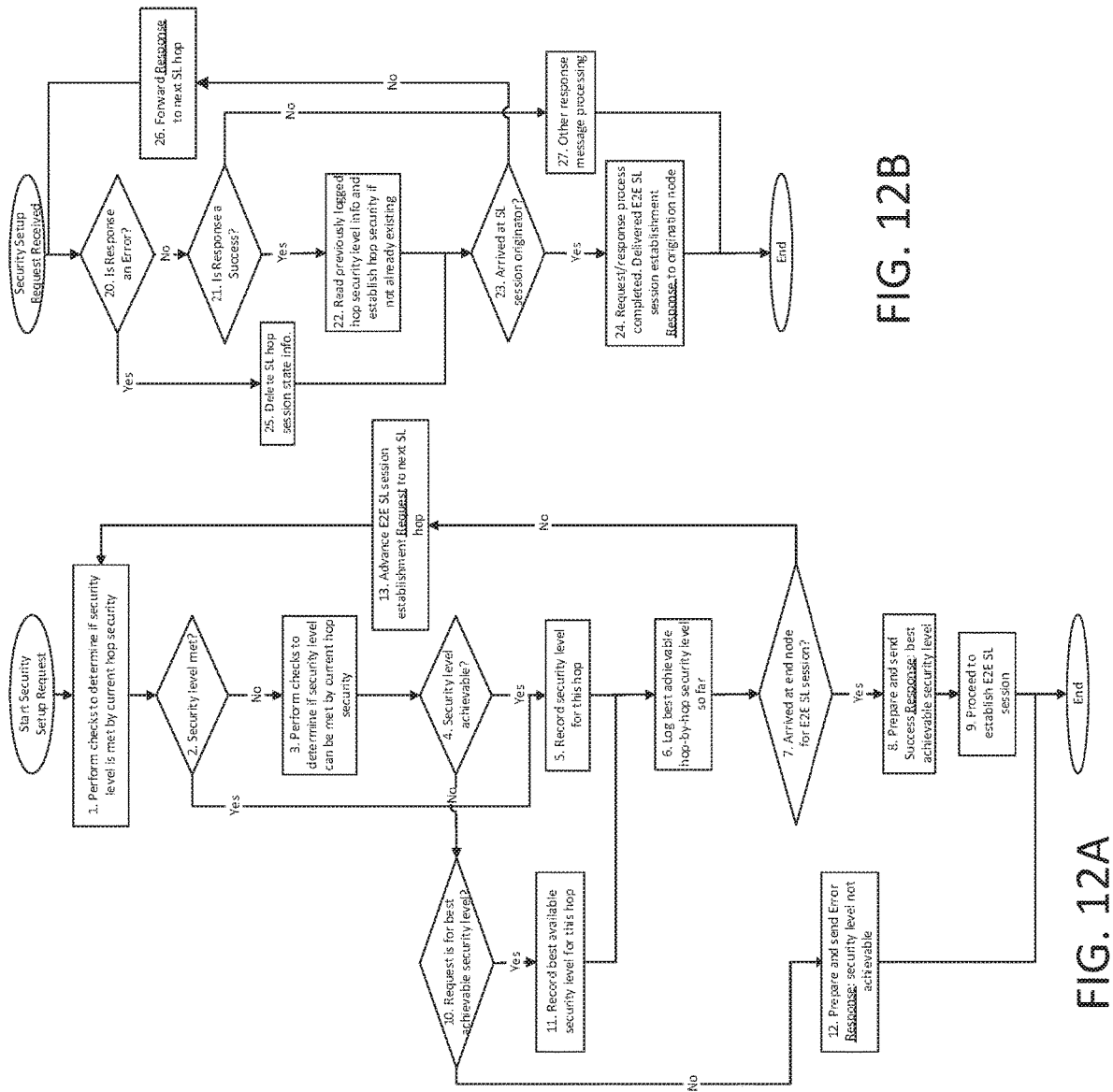
FIGS. 12A-B are diagrams of a method to Manage Security for a Session Sharing a Hop

A method for managing security, where security for one or more of the hop connections may have already be established for another session, during the establishment of an E2E SL session is outlined in FIGS. 12A-B.

A pre-requisite to the procedure shown is a SL registrant (e.g. a backend application 902) first generates a request for the establishment of a SL session between itself and a target SL session endpoint (e.g. device application). In the request, a SL registrant can specify its security requirements for the E2E SL session by including information in the request that specifies the desired security level as outlined in Table 3 and whether the requirement has to be met or best efforts may be acceptable.

Note that the SL registrant may specify that it is not permissible for its SL Session to share a hop connection, or it may limit the number of hop connections that are shared, or it may specify that only the first and/or last hop connections may be shared.

The point at which the E2E SL Session Establishment Request is received by the SL registrant's local SL, is the point at which the procedure defined in FIGS. 12A-B starts. This procedure is used to process the E2E SL Session Establishment Request as it is propagated towards the target SL session endpoint as well as the corresponding response as it flows back towards the SL registrant that originated the request.

Start Request Processing—A Receiver (i.e. an intermediate SL instance or the targeted SL session endpoint) detects an incoming request and checks whether or not it is a SL Session Establishment Request. This check is performed by analyzing header information in the SL message which indicates the SL message type. If it is a SL Session Establishment Request it proceeds to step 1.

In step 1 of FIG. 12A, a check is performed to determine if the requested security level between this node and its neighboring SL session hop partner may be achieved.

In step 2 of FIG. 12A, if the security level requested has already been established by an existing link then proceed to Step 5 of FIG. 12A. If not then proceed to Step 3 of FIG. 12A.

In step 3 of FIG. 12A, a check is performed to determine if the requested security level may be achieved by this node to the next node and its neighboring SL session hop partner.

In step 4 of FIG. 12A, if the security level is achievable then proceed to Step 3 of FIG. 12A. If not then proceed to Step 9 of FIG. 12A.

In step 5 of FIG. 12A, the security level which meets the requirement from the originating node is logged for later retrieval and setup of the hop security.

In step 6 of FIG. 12A, the best achieved security level based on what can be achieve from the evaluation of earlier hops is logged for later reference when setting up the E2E hop-by-hop security.

In step 7 of FIG. 12A, if the Request message has not arrived at the E2E destination node then go to Step 8 of FIG. 12A to perform checks for the next hop. If at the destination node then go to Step 6 of FIG. 12A.

In step 8 of FIG. 12A, prepare a SL session establishment response message indicating that the E2E hop-by-hop security can be established and with the achievable security level. The destination SL session endpoint, upon receiving the request can perform actions such as, but not limited to, verifying that the initiation node endpoint has the proper permissions to establish an E2E SL session with the destination node. The response may contain information such as but not limited to:

The E2E SL Session ID
The Hop Connection ID
A successful response code
The best achievable security level This response is then sent back to the Receiver's same neighboring SL session hop partner which it received the request from through the chain back to the initiation node.

In step 9 of FIG. 12A, proceed to setup the E2E hop-by-hop security during traversal of the Response message back to the initiation end point, as determined from the earlier evaluation.

In step 10 of FIG. 12A, a check is carried out to determine if the initiation node has requested best efforts security setup. If so the proceed to Step 11 of FIG. 12A. If not then proceed to Step 12 of FIG. 12A.

In step 11 of FIG. 12A, the best achievable security level is determined for the node and recorded for later retrieval and setup of the hop security.

In step 12 of FIG. 12A, the hop node is not able to successfully process the E2E SL Session Establishment request with the required security level. An error response is prepared for transmission back to the initiation node with that same neighboring SL session hop partner which it received the request from.

In step 13 of FIG. 12A, propagate the E2E SL session Request to the next hop and continue at Step 1 of FIG. 12A.

Start Response Processing—Upon receiving a response to the E2E SL Session Establishment request, the response message is sent back through the same path used to establish a path to the termination node.

In step 20 of FIG. 12B, upon receiving this response, the neighboring SL session hop partner can process the response using this same procedure (see Step 11 of FIG. 12A).

In step 21 of FIG. 12B, if the response is a success then proceed to Step 22. If not then proceed to Step 27 of FIG. 12B.

In step 22 of FIG. 12B, the hop security level information which had been evaluated earlier is compared with the currently setup security level information. The security for the hop link is re-established if a change is required to meet the best achievable security level information.

In step 23 of FIG. 12B, if the Response message has not arrived at the E2E initiation node then go to Step 26 of FIG. 12B to perform checks for the next hop. If at the destination node then go to Step 24 of FIG. 12B.

In step 24 of FIG. 12B, the E2E SL Session and the Request/Response is deemed to have been successfully established and the E2E SL session setup response message delivered to the initiation node.

In step 25 of FIG. 12B, an error has occurred so the receiving hop node removes any SL session state and any other configuration information which may be used to setup for the E2E SL Session Establishment processing. If there is an error at any hop on the security session path, the security establishment will fail and the error propagated to the initiation node.

In step 26 of FIG. 12B, propagate the E2E SL session Request to the next hop and continue at Step 20 of FIG. 12B.

In step 27 of FIG. 12B, the response message received is other than an error or success message so pass on to message parsing routine.

It is understood that the entities performing the steps illustrated in FIGS. 12A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIGS. 12A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIGS. 12A-B. It is also understood that any transmitting and receiving steps illustrated in FIGS. 12A-B may be performed by communication circuitry of the node under control of the processor of the node and the computer-executable instructions (e.g., software) that it executes.

Methods to Manage Security Re-evaluation when a Session is Torn Down

A method for re-evaluating the hop level security when an E2E SL session is terminated or torn-down is defined below with respect to FIG. 13.

A pre-requisite to the procedure shown is a SL registrant (e.g. a backend application 902) first generates a request to terminate or teardown an E2E SL session between itself and a target SL session endpoint (e.g. device application). In this request, a SL registrant specifies the E2E SL Session ID as well as the target session endpoint. This request is then forwarded to the SL registrant's local SL for processing.

The point at which the E2E SL session teardown request is received by the SL registrant's local SL, is the point at which the procedure defined in FIG. 13 starts. This procedure can be used to process the E2E SL session teardown request as it is propagated hop-by-hop towards the target SL session endpoint. This procedure can also be used to process and complete the corresponding E2E SL session teardown response, on a hop-by-hop basis, as it flows back towards the SL registrant that originated the teardown request.

The detailed steps of the procedure are defined below.

Start Request Processing—A Receiver (i.e. an intermediate SL instance or the targeted SL session endpoint) detects an incoming request and checks whether or not it is a SL Session Teardown Request. This check is performed by analyzing header information in the SL message which indicates the SL message type. If it is a SL Session Teardown Request it proceeds to step 1 of FIG. 13A.

Figure 13A:
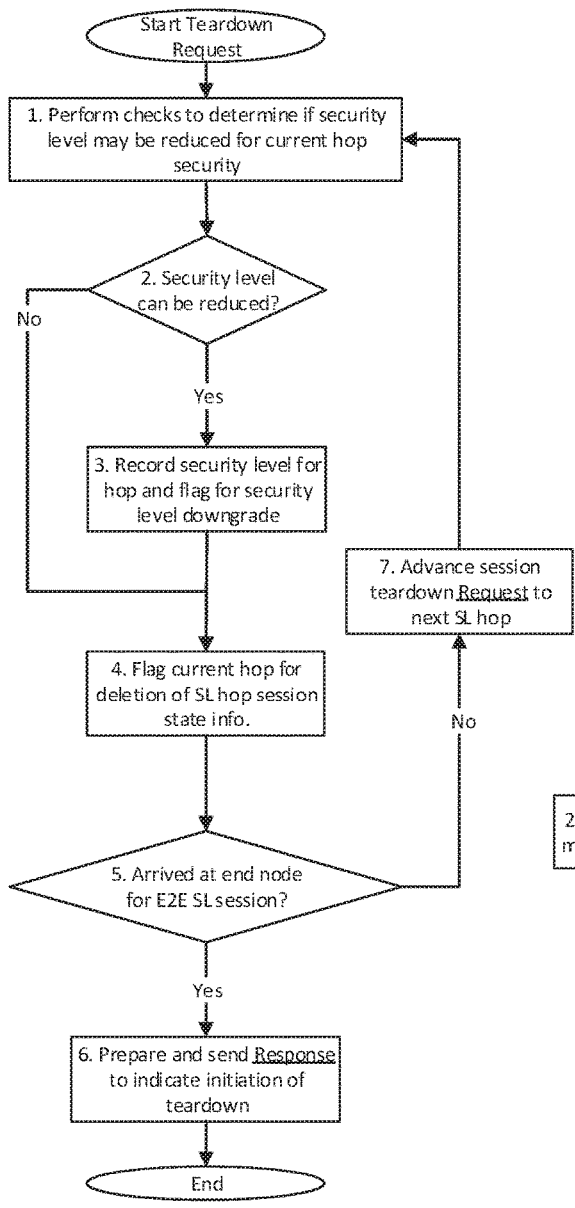
FIGS. 13A-B are diagrams of a method to Manage Security Re-evaluation when a Session is Tom Down

In step 1 of FIG. 13A, a check is performed to determine if the security level between this node and its neighboring SL session hop partner may be reduced.

In step 2 of FIG. 13A, if the security level may be reduced then proceed to Step 3 of FIG. 13A. If not then proceed to Step 4 of FIG. 13A.

In step 3 of FIG. 13A, the security level may be reduced so flag the hop for security level reduction, record and log the security level for later retrieval and setup of the hop security.

In step 4 of FIG. 13A, the current hop is flagged for removal of any SL session state and any other configuration information.

In step 5 of FIG. 13A, if the Request message has not arrived at the E2E destination node then go to Step 1 of FIG. 13A to perform checks for the next hop. If at the destination node then go to Step 6 of FIG. 13A.

In step 6 of FIG. 13A, prepare a SL session teardown response message indicating that the E2E hop-by-hop security can be torn down for the session. This response is then sent back to the Receiver's same neighboring SL session hop partner which it received the request from through the chain back to the initiation node.

In step 7 of FIG. 13A, propagate the E2E SL session teardown request to the next hop and continue at Step 1 of FIG. 13A.

Start Response Processing—Upon receiving a response to the E2E SL Session teardown request, the response message is sent back through the same path used to establish a path to the termination node.

Figure 13B:
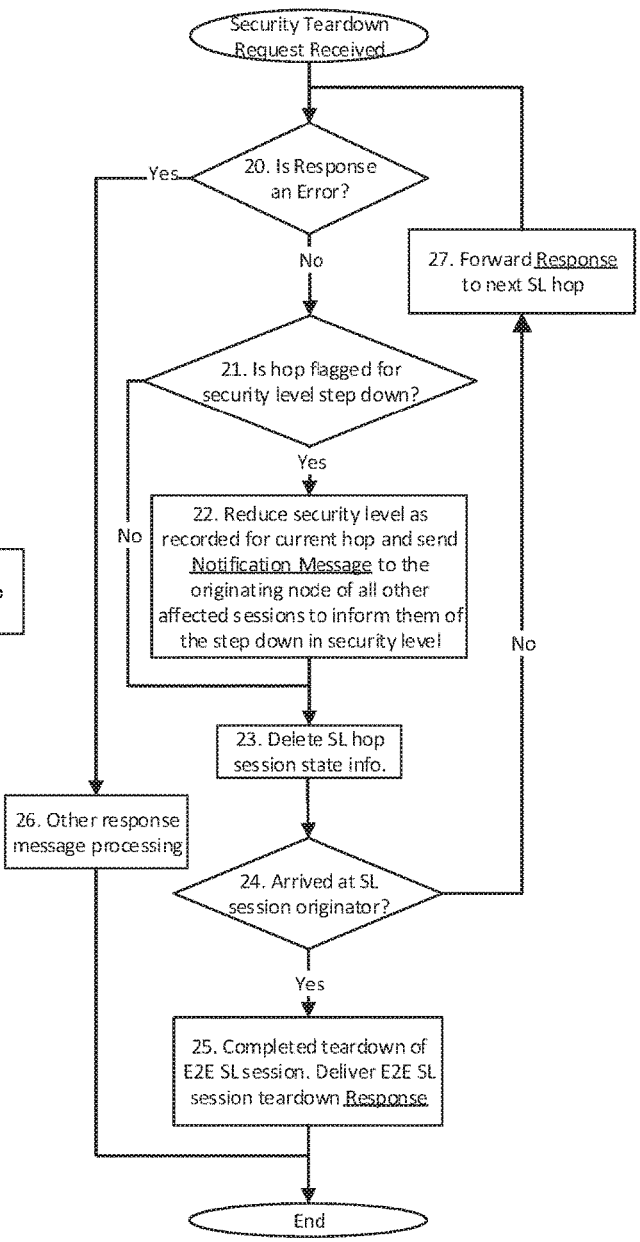

In step 20 of FIG. 13B, if the response is a success then proceed to Step 21 of FIG. 13B. If not then proceed to Step 26 of FIG. 13B.

In step 21 of FIG. 13B, if the hop has been flagged for security level step down then proceed to Step 22 of FIG. 13B. If not then proceed to Step 23 of FIG. 13B.

In step 22 of FIG. 13B, the hop security level information which had been evaluated earlier is used to step down the security level for the current hop and the security for a hop link is established using the lower recorded security level information. Additionally, the initiation and optionally the termination nodes for all sessions being shared and serviced by the current node are notified of the step down in security through a notification message.

In step 23 of FIG. 13B, the SL session state and any other configuration information is deleted/removed.

In step 24 of FIG. 13B, if the Response message has not arrived at the E2E initiation node then go to Step 25 of FIG. 13B to perform checks for the next hop. If at the destination node then go to Step 20 of FIG. 13B.

In step 25 of FIG. 13B, the E2E SL Session Teardown and the Request/Response is deemed to have been successfully carried out and the E2E SL session Teardown response message delivered to the initiation node.

In step 26 of FIG. 13B, the response message received is other than an error or success message so pass on to message parsing routine. In step 27 of FIG. 13B, propagate the E2E SL Session Teardown Response to the next hop and continue at Step 20 of FIG. 13B.

It is understood that the entities performing the steps illustrated in FIGS. 13A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIGS. 13A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIGS. 13A-B. It is also understood that any transmitting and receiving steps illustrated in FIGS. 13A-B may be performed by communication circuitry of the node under control of the processor of the node and the computer-executable instructions (e.g., software) that it executes.

oneM2M E2E SL Security Management System oneM2M SL Architecture

Figure 14:
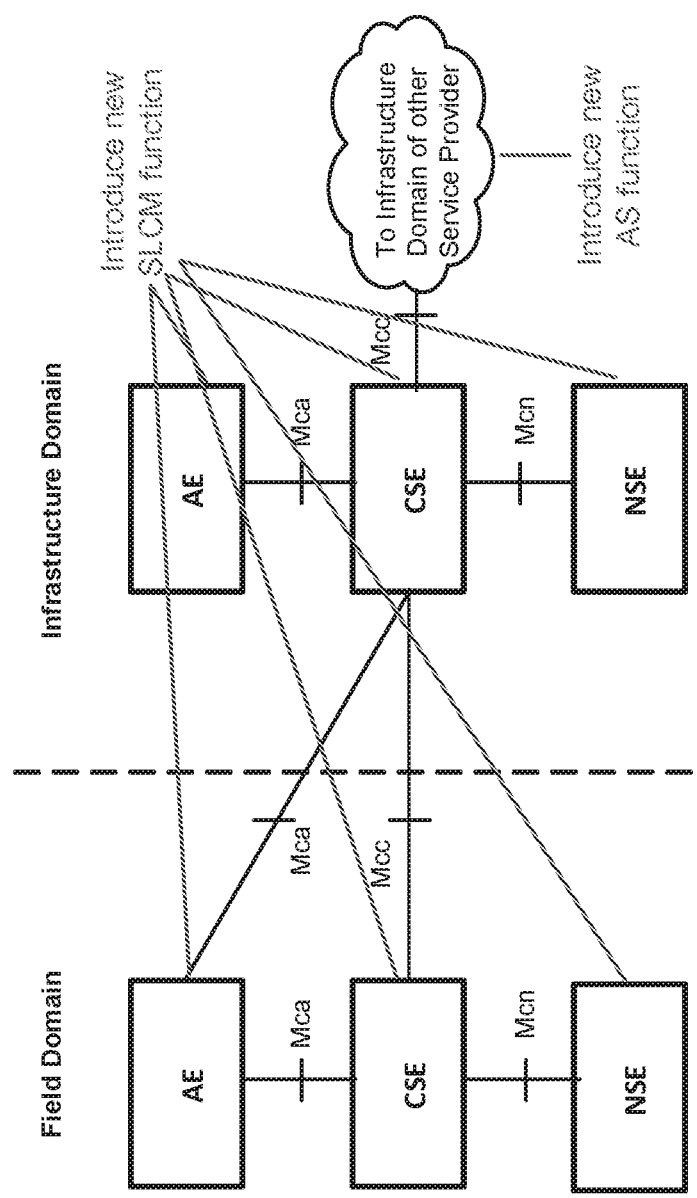
FIG. 14 is a diagram of an oneM2M SL Architecture
Figure 15:
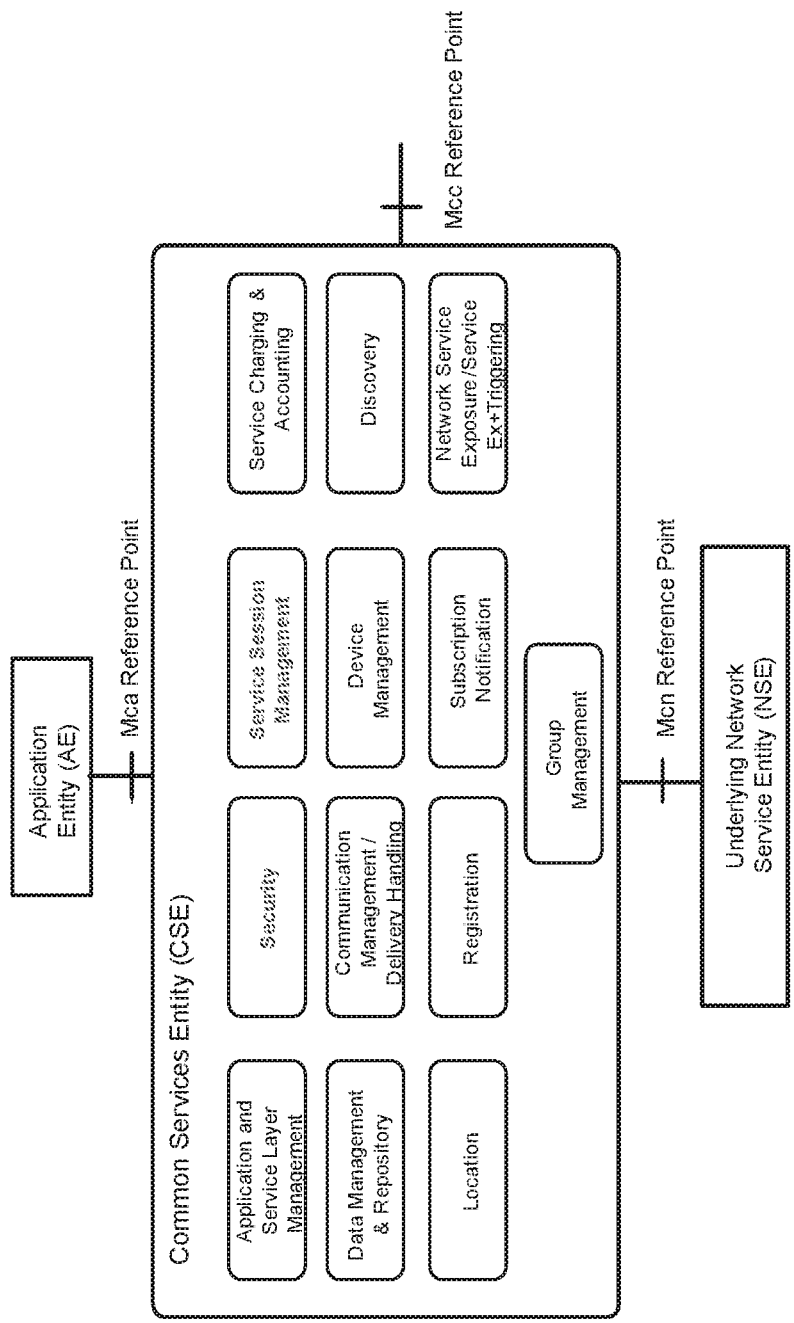
FIG. 15 is a diagram of an oneM2M Common Service Functions

The oneM2M standard (oneM2M-TS-0001, oneM2M Functional Architecture-V-1.6.1) defines an IoT SL. The purpose of the SL is to provide "horizontal" services that can be utilized by different "vertical" M2M systems and applications, such as e-Health, fleet management, and smart homes. The architecture of the oneM2M SL as shown in FIG. 14 defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, security, location services and device triggering. A CSE contains multiple logical functions called "Common Service Functions (CSFs)", such as "Discovery", "Security" "Data Management & Repository". FIG. 15 illustrates the CSFs supported by oneM2M.

The oneM2M architecture enables the following types of Nodes:

Application Service Node (ASN): An ASN is a Node that contains one CSE and contains at least one Application Entity (AE). Example of physical mapping: an ASN could reside in an M2M Device.

Application Dedicated Node (ADN): An ADN is a Node that contains at least one AE and does not contain a CSE. There may be zero or more ADNs in the Field Domain of the oneM2M System. Example of physical mapping: an Application Dedicated Node could reside in a constrained M2M Device.

Middle Node (MN): A MN is a Node that contains one CSE and contains zero or more AEs. There may be zero or more MNs in the Field Domain of the oneM2M System. Example of physical mapping: a MN could reside in an M2M Gateway.

Infrastructure Node (IN): An IN is a Node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN): A non-oneM2M Node is a Node that does not contain oneM2M Entities (neither AEs nor CSEs). Such Nodes represent devices attached to the oneM2M system for interworking purposes, including management.

Figure 16:
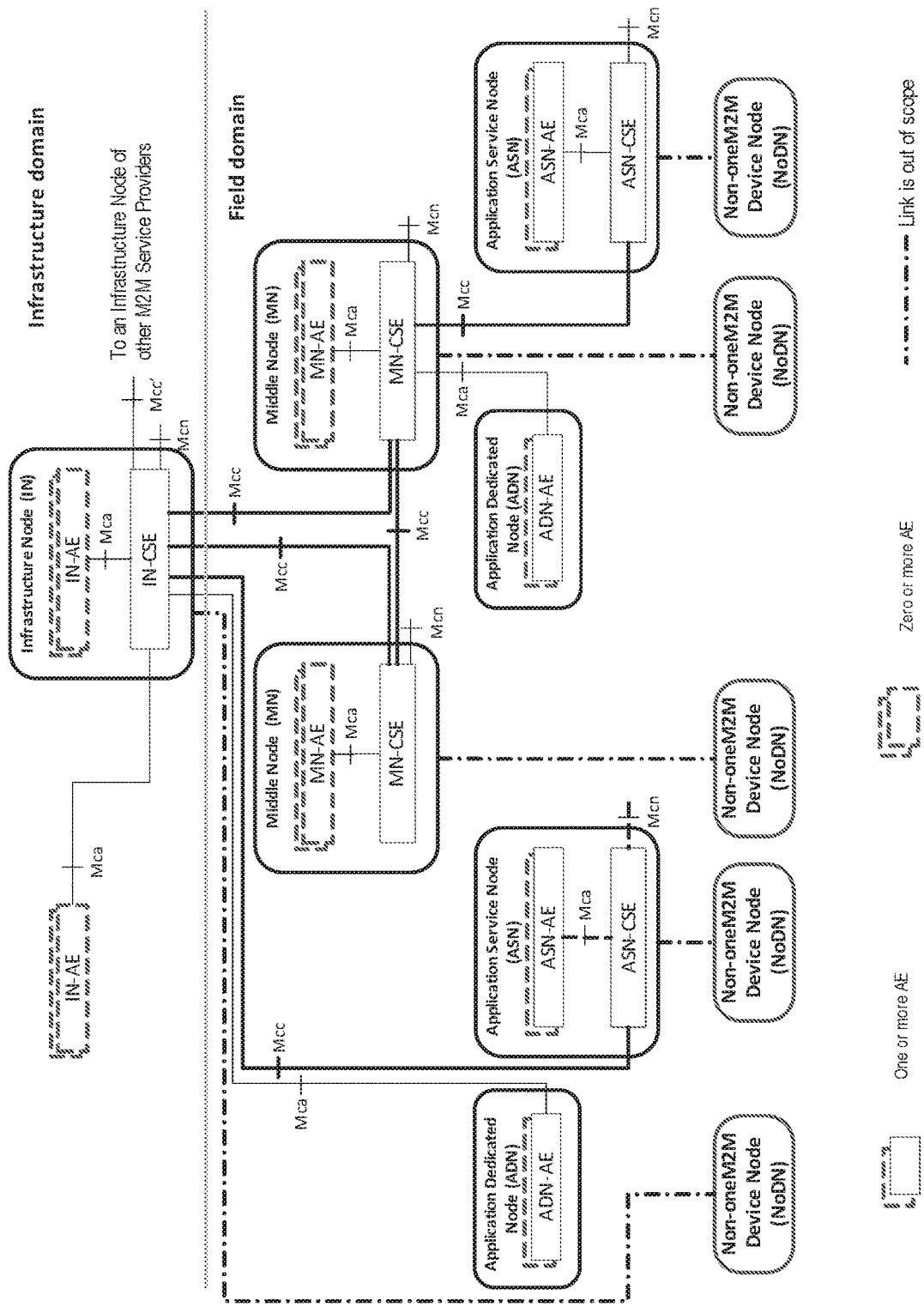
FIG. 16 is a diagram of Configurations Supported by oneM2M Architecture

The possible configurations of inter-connecting the various entities supported within the oneM2M system are illustrated in FIG. 16.

oneM2M communications are centered on a Request/Response based communications mechanism and sometimes there may be long time periods between sending a Request and Receiving a response depending upon the connectivity and capabilities of the communicating nodes. There are two types of communications in oneM2M: blocking or non-blocking communications.

In a blocking communication Request, it is assumed that the Originator of a Request can always wait long enough to get a Response to the Request after the requested operation has finished. This implies potentially long or unknown blocking times (time for which a pending Request has not been responded to) for the Originator of a Request.

In a non-blocking communication Request, the Originator of a Request may ask for only a response with an Acknowledgement indicating acceptance of the Request and an optional reference to the context where the result of the requested operation is expected. It is necessary to provide a prompt response to the Originator with an Acknowledgement. Optionally, a reference may also be requested to enable the Originator to retrieve the status of the Request and the outcome of the requested operation at a later time.

oneM2M Service Layer Session Management

A Service Layer Session Management service (SSM CSF) is introduced in FIG. 15. The SL session is an end-to-end SL connection managed by the SSM CSF, together with the definition of several requirements for the SSM CSF. For example, the Session Management service shall support the following features:

1) SSM CSF shall support requests to establish an SL session between AEs, between an AE and a CSE, or between CSEs.
2) The SSM CSF shall support SL sessions that span multiple transit CSE hops.
3) Before a request to establish an SL session is granted, the SSM CSF shall first authenticate the requester using pre-established credentials.
4) The SSM CSF shall use the SEC CSF to support end-to-end authentication. Once authenticated, the SSM CSF shall establish the M2M SL between the requesting and targeted session endpoints
5) The SSM CSF shall return session ID to the requester.
6) The SSM CSF shall also maintain additional session information for the management of the session such as session policies, session routing information, session descriptor, etc.
7) The SSM CSF shall support requests to terminate an SL session between AEs, between an AE and a CSE, or between CSEs.
8) The SSM CSF shall support layering of a SL session over the top of Underlying Network connections and the SSM CSF shall support persistency of the SL sessions with respect to the Underlying Network connections.
9) The SSM CSF shall maintain an active SL session independent of the state of the Underlying Network connections and shall be robust to network connections that are dynamically torn-down and re-established.
10) The SSM CSF shall support initiating or providing input to other CSFs and/or the Underlying Network on whether the network connections should be torn-down/re-established based on SL session activity or state.

Definition of the security functionality of the SSM CSF to support the requirements outlined above and the architecture or the design that meets these requirements from a security perspective is the subject of this disclosure.

Many of the requirements above can be achieved by executing the procedure that is defined in FIG. 9 over the oneM2M Mcc reference point.

oneM2M E2E Security

Figure 17:
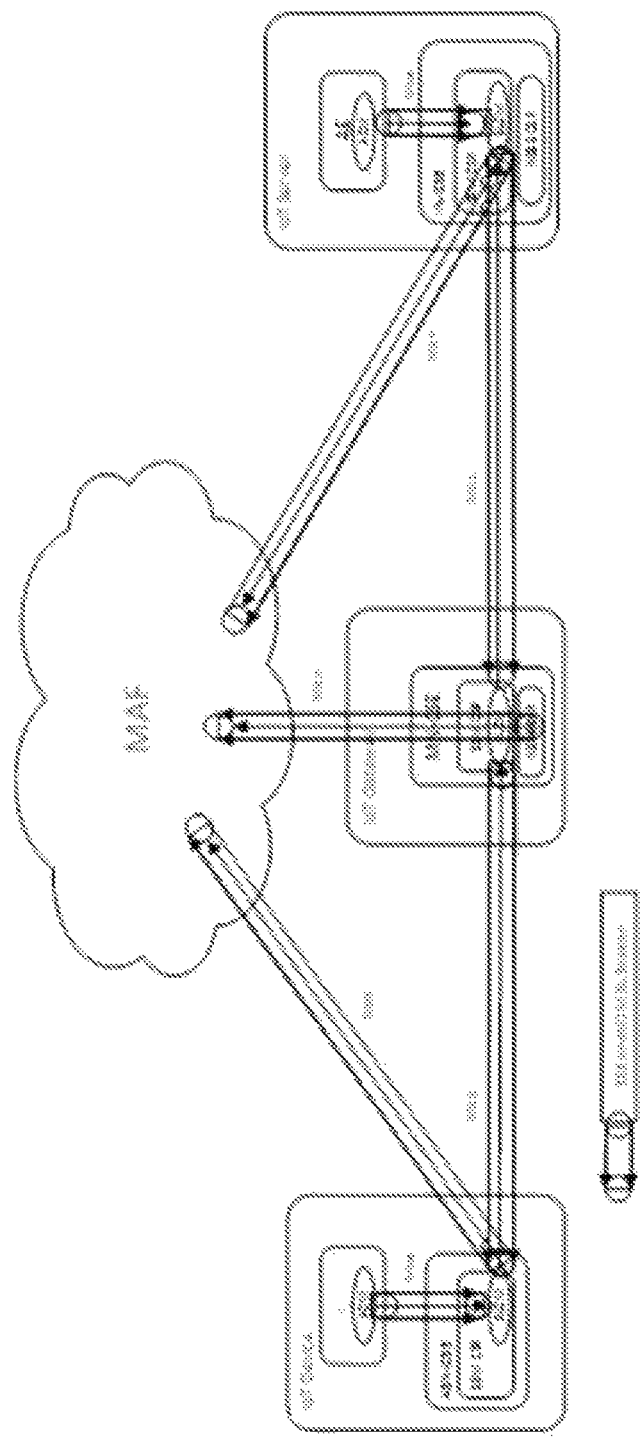
FIG. 17 is a diagram of an oneM2M E2E SL Security Management System

FIG. 17 illustrates an embodiment in which a SLCM is realized as a supported function of the oneM2M defined Service Session Management (SSM) CSF. This SLCM enabled SSM CSF is supported by oneM2M CSEs that are hosted on an IoT Device (i.e. ASN-CSE), IoT Gateway (i.e. MN-CSE) and a IoT Server (IN-CSE).

oneM2M defines methods and procedures for two adjacent hop nodes to establish a secure SL communications session. The procedures define methods which use symmetric shared keys for authentication and key establishment or methods which use certificates for public-private key based authentication and key establishment. The SLCM in each node enables the oneM2M AEs to establish an E2E oneM2M SL Session with one another with specific SL hop-by-hop security requirements. The authentication procedures may be performed between the two communicating nodes or through assistance from an AS 702 known as the M2M Authentication Function (MAF) in oneM2M.

Through the assistance of the SLCM, proper adjustments and alignment of security requirements may be achieved at the oneM2M service layer. In doing so, the E2E security requirements of the AEs can be managed by the CSEs on a coordinated hop-by-hop basis and ultimately on an E2E basis using the methods discussed herein. As a result, the oneM2M AEs are able to communicate with one another in a manner which meets the specifications of an oneM2M hop-by-hop security and at the same time meeting the requirements for complete E2E SL security.

E2E Security can be achieved in a oneM2M system by executing the procedures of FIG. 11, FIG. 12, and FIG. 13 over the Mcc reference point.

It is understood that the functionality illustrated in FIGS. 14-17 may be implemented in the form of software (i.e., computer-executable instructions) stored in a memory of, and executing on a processor of, a node of an M2M network (e.g., a server, gateway, device, or other computer system), such as one of those illustrated in FIG. 21C or 21D described below.

oneM2M SLCM API Embodiment

Existing contributions have been to define an API for an oneM2M SSM CSF to allow an AE to establish an E2E oneM2M SL Session. This API is based on resource definitions (i.e. a RESTful API). The resources defined thus far include <session>, <sessionPolicy>, and <sessionContext>. Enhancements are proposed to the <session> resources that enables an AE to define, during the establishment of an E2E SL session, application specific E2E security requirements. These API enhancements can be used to realize an oneM2M SLCM API.

The following enhancements to these resources can be used to request the establishment or tear-down of an E2E SL Session by allowing an E2E SL Session originator (i.e. an AE) to create or delete these resources within its local CSE, respectively. In addition, these resources can also be used by intermediate CSEs to establish or tear-down an E2E SL Session in a hop-by-hop manner. This can be done by an intermediate CSE creating or deleting these resources on the next-hop CSE during the establishment or tear-down, respectively, of an E2E SL Session. In doing so, each CSE in a multi-hop E2E SL Session configuration can maintain a corresponding set of these resources for each E2E SL Session. These resources provide a CSE with awareness and the ability to maintain the security state for each E2E SL Session it helps support.

Definition of Enhancements to Request/Response Messages

In oneM2M, the Request message incorporates some basic information elements such as:
  To: Address of the target resource or target attribute for the operation.
  From: Identifier representing the Originator.
  Operation: Operation to be executed: Create (C), Retrieve (R), Update (U), Delete (D), Notify (N).
  Request Identifier: Request Identifier (a unique identifier to enable correlation between a Request and corresponding Response).

The following additional Optional Parameters may also be included to provide information on handling of hop-by-hop security:
  Session ID: A unique session identifier for a specific E2E SL session.
  Initiation Node ID: Identifier for the node at the initiation end of the E2E SL session.
  Termination Node ID: Identifier for the node at the termination end of the E2E SL session.
  Security Level: The required E2E SL session communication security level. This Security Level defines the security required for a communication hop and may be given in abstract terms as a security level (e.g. LOW, MED, or HIGH in the simplest of cases or a numeric value which increases with increasing requirements for security). The Security Level may be converted to specific security association parameters at each node (e.g. authentication algorithm, key length etc. based on its specific capabilities).
  Best Efforts Security: An indication whether the security level has to be met for a successful communication session to be setup or if best efforts security is acceptable.
    Absolute: The security level specified is to be met by all hop nodes in order to successfully setup a session.
    Best Efforts: The security level specified is a guidance for hop nodes. If an individual hop node is not able to provide the required security level then it may provide the best achievable security level and forward this information to other nodes in a hop-by-hop communication.
  Achieved Security Level: The best achieved security level based on the capabilities of all hop nodes that have been involved in the SL communications path so far. This security level assists other hop nodes to optimally establish their own security. This is a NULL field in the case of this message arriving from an Originator node.

And the Response message consists of the following basic information elements:
  Response Code: Response code: This parameter indicates whether the requested operation was successful, unsuccessful or is an acknowledgement
  Request Identifier: Request Identifier. The Request Identifier in the Response shall match the Request Identifier in the corresponding Request message.

The following additional Optional Parameters may also be included to provide information to an Initiation node on the achievable E2E security:

Session ID: The unique session identifier for a specific E2E SL session. This parameter shall match the Session ID in the corresponding Request message.

Achieved Security Level: The best achieved security level based on the capabilities of all hop nodes involved in and E2E SL communication session.

Definition of SL Session Resources

Figure 18:
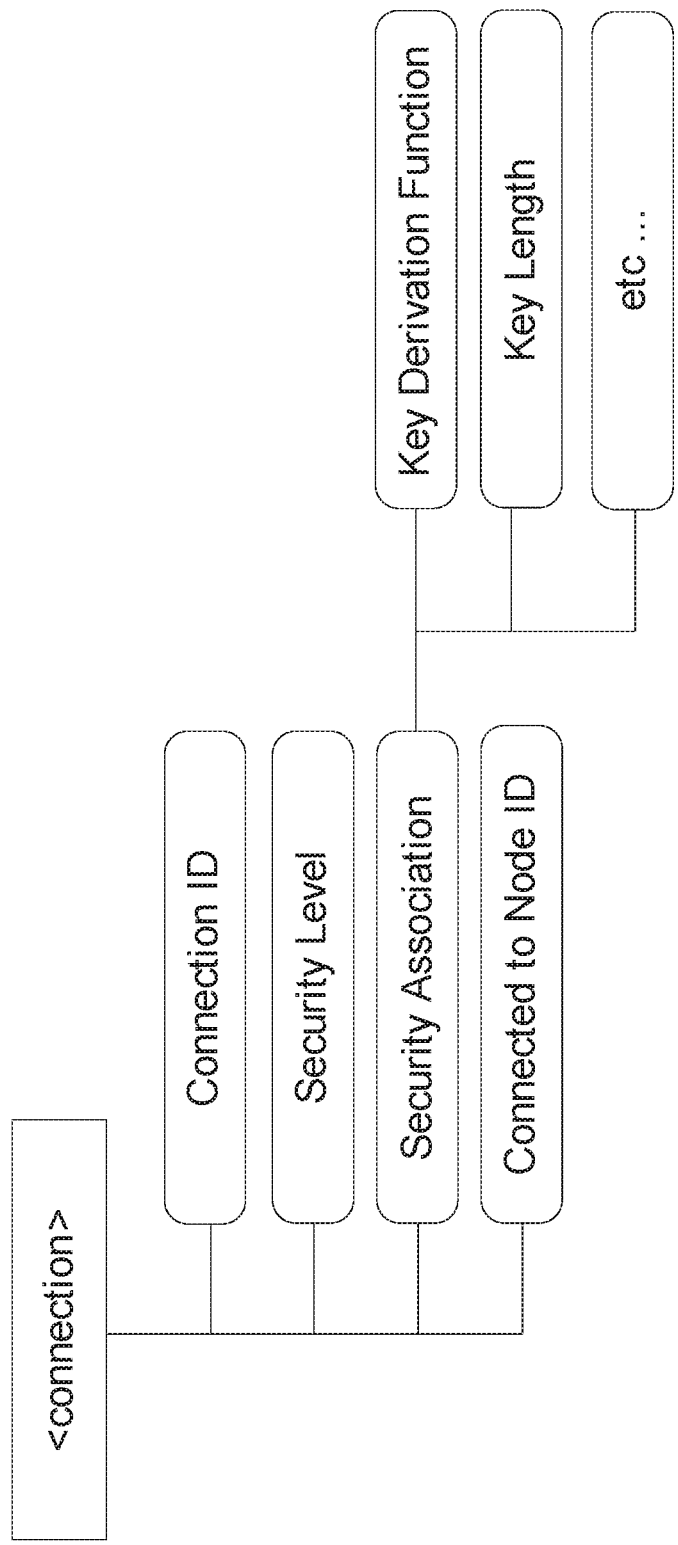
FIG. 18 is a diagram of a oneM2M Node SL Connection Security Attributes

An individual oneM2M node may support many connections to other nodes and each connection may support many session hops. Since the connection capabilities of a node are common to all sessions being services and shared, each individual session is reliant on the setup of the supporting connection. In order to support the security management features, the connection resource is enhanced to support additional attributes as outlined in FIG. 18.

Enhancements to the oneM2M <connection> resource include four new attributes to support the node specific security attributes in support of application specific E2E security requirements associated with a particular oneM2M E2E SL Session. These include the connectionID, securityLevel, securityAssociation and ConnectedToNodeID which are defined in Table 5.

TABLE 4

Security Attributes for oneM2M <connection> Resource

| Attribute Name | Description |
|---|---|
| Connection ID | A unique connection identifier for the specific connection being supported by the node. |
| Security Level | Specification of the connection security level. This may be in the form of a level (as in LOW to HIGH) or numeric where progressively increasing values indicate higher and higher level of security. |
| Security Association | Specification of the security association attributes for the connection as defined in Table 3 and related to the Security Level. |
| Connected to Node ID | Identifier for the adjacent node to which the node is connected. |

Enhancements to the oneM2M <session> resource are defined below. This includes seven new attributes to enable an AE to define application specific E2E security requirements associated with a particular oneM2M E2E SL Session. These include the sessionID, securityRequired, securityAchievable, connectionID, initiationNodeID, terminationNodeID, TxNodeID, RxNodeID, and Status attributes which are defined in Table 5. A RESTful API could be defined for a set of resources and attributes that can be accessed by a trusted application or 3$^{rd}$ party service (e.g. by a SLCM function supported by an oneM2M CSE).

Figure 19:
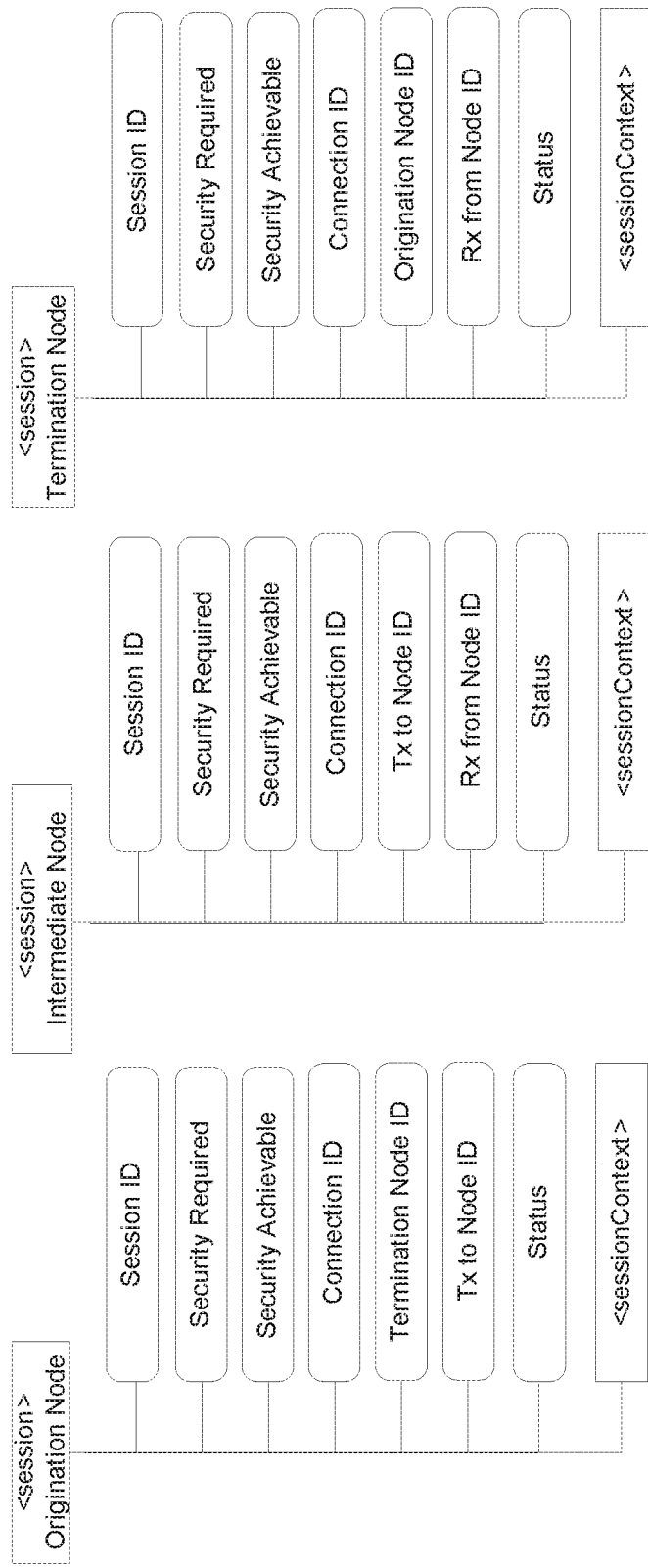
FIG. 19 is a diagram of a E2E Node SL Session Attributes

FIG. 19 shows the resource structures for managing service layer sessions defined by ARC-2013-563, oneM2M contribution, SSM CSF Resources, Nov. 13, 2013 for the various nodes involved in an E2E SL communications session. A <session> resource contains attributes and sub-resources for managing an individual SL session. A separate instance of a session record may be created by an initiation or termination node such as an AE or CSE and by intermediate hop-by-hop nodes (such as an NSE) in order to maintain connectivity information for each E2E SL session.

TABLE 5

E2E Communication Attributes for oneM2M <session> Resource

| Attribute Name | Description |
|---|---|
| Session ID | A unique session identifier for the specific E2E SL communication session between two nodes. An E2E SL Session may span multiple hops. |
| Security Required | Specification of the required security for the E2E SL session. This may be in the form of a level (as in LOW to HIGH) or in terms of specific attributes of a security association as defined in Table 3. |
| Security Achievable | Specification of the actual achievable security for an individual hop or over the entire E2E SL session after all negotiations with the intermediate assisting nodes. This may be in the form of a level (as in LOW to HIGH) or in terms of specific attributes of a security association as defined in Table 3. |
| Connection ID | A unique connection identifier for the specific node communications connection between two Service Layer or a Service Layer and an AE, which is supporting a service or hop node session of the E2E SL session. A connection may multiplex traffic from more than one E2E SL Session and all traffic over the connection may share a security association. |
| Initiation Node ID | Identifier for the node at the initiation end of the E2E SL session. |
| Termination Node ID | Identifier for the node at the termination end of the E2E SL session. |
| Tx to Node ID | Identifier for the node to which the current intermediate node transmits to and which forms a hop and part of the E2E session. |
| Rx from Node ID | Identifier for the node from which the current intermediate node receives from and which forms a hop and part of the E2E session. |
| Status | Service status for the node in terms of: Initialization: Security has been evaluated as a result of receiving an E2E SL Session Establishment Request and awaiting further instructions. e.g. awaiting a Response message to subsequently setup security for a hop that does not have a session established. Active: A SA has been setup and the connection is actively being used. StepDown: A SA has been flagged for step down as a result of receiving an E2E SL Session Teardown Request. StepUp: A SA has been flagged for step up as a result of receiving an E2E SL Session Establishment Request and awaiting further instructions. e.g. awaiting a Response message to subsequently setup enhanced security for a link which is already being used for other sessions. |

User Interface

Figure 20:
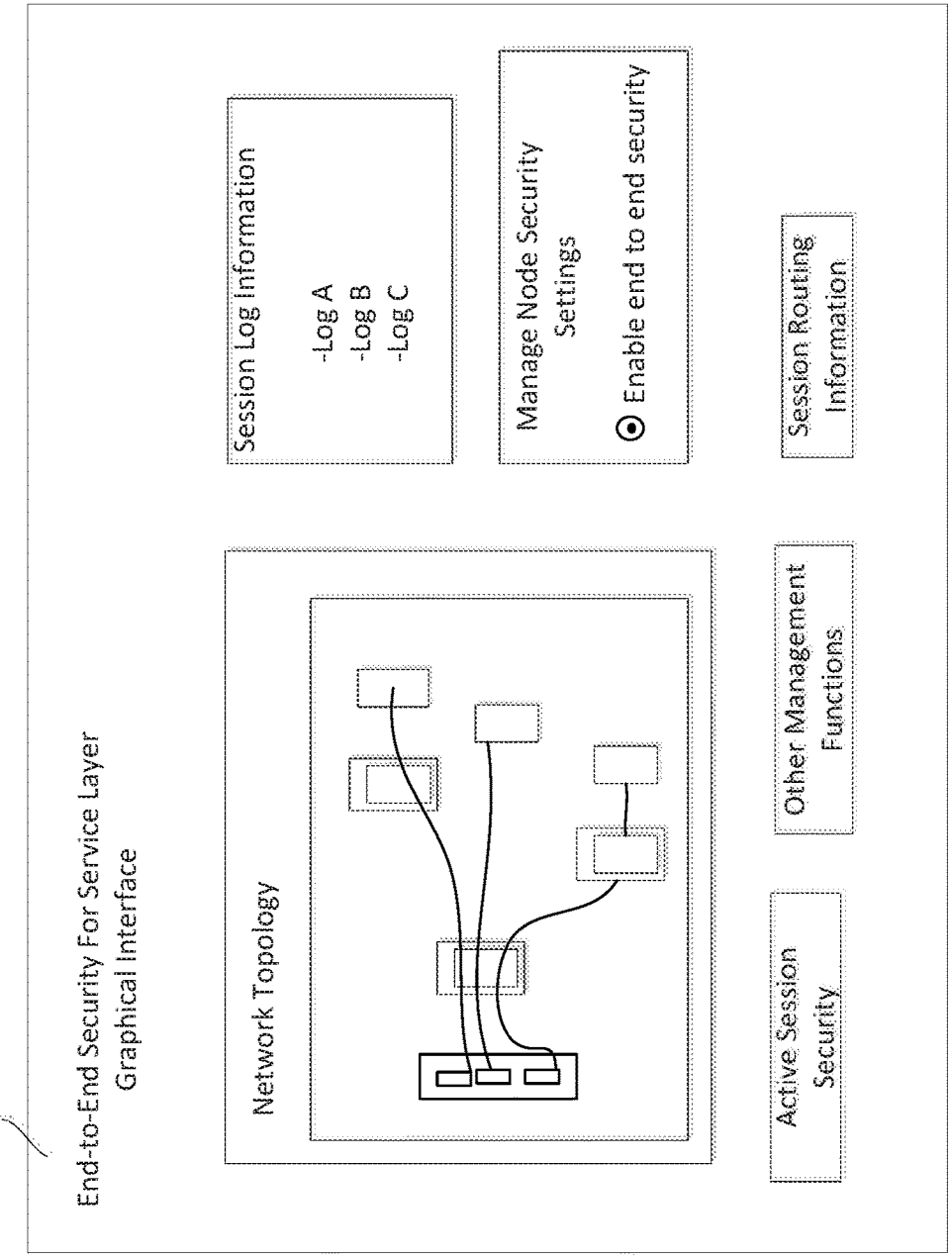
FIG. 20 is a diagram of a Graphical User Interface of one embodiment.

Interfaces, such as Graphical User Interfaces (GUIs), can be used to assist an administrative user to control and/or configure functionalities related to the end-to-end security for hop-by-hop services. FIG. 20 is a diagram that illustrates an interface 2002 that allows a user to monitor graphically the session and hop-by-hop security provisioned and being used to facilitate SL communications sessions and see key aspects of the network security being managed and controlled. It is to be understood that interface 2002 can be produced using displays such as those shown in FIGS. 21C-D described below.

User interface 2002 associated with this feature (i.e. E2E security management) can be part of the network management system (NMS) associated with the overall IoT network over which SL communications sessions are being conducted.

The details shown to the user may be high level and graphical in nature and abstracted to show only important parameters with the ability to drill down into more and more detail based on user navigation. Exemplary aspects of the user interface 2002 can include:

Input:
  The administrator may monitor, observe and manage the security settings of various nodes.
  The administrator may perform user management functions.

Output (can include one or more of the following items):
  A graphical view of the topology of the network with the various sessions being supported and their security settings.
  A list of the currently active sessions and their security attributes on a hop-by-hop basis.
  Session routing information both graphically and as tables.
  Session log records such as information related to sessions being setup and terminated.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 21A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002.

As shown in FIG. 21A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 21B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002. The M2M service layer 22 may be implemented by one or more servers, computers, devices, virtual machines (e.g. cloud/storage farms, etc.) or the like, including for example the devices illustrated in FIGS. 21C and 21D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 21B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002 may be hosted within a M2M service layer instance hosted by an M2M node, such as an M2M server, M2M gateway, or M2M device, as shown in FIG. 21B. For example, the logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21C or FIG. 21D described below.

Further, logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002 can implemented as part of an M2M network that uses a Service Oriented Architecture (SOA) and/or a Resource-Oriented Architecture (ROA) to access services of the present application.

FIG. 21C is a block diagram of an example hardware/software architecture of a M2M network node 30, such as an M2M device 18, an M2M gateway 14, an M2M server, or the like. The node 30 can execute or include logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002. The device 30 can be part of an M2M network as shown in FIG. 21A-B or part of a non-M2M network. As shown in FIG. 21C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 21C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 21D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 21A and FIG. 21B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 21 A-B or the device 30 of FIG. 21 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as service layer 102, applications 104, application protocols 106, applications 302, 308, 314, 904, service layer instances 306, 310, 318, 906, 908, network applications 316, 304, 312, 902, authentication server 702, SLCMs, AEs, CSEs, NSEs, and logical entities to produce user interface 2002 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to:
   receive a first indication of an overall required security level, the indication comprising a security level value for a multi-hop end-to-end service layer connection, wherein the multi-hop end-to-end service layer connection comprises multiple service layer hop connections, and wherein each service layer hop connection comprises a direct service layer connection between two service layer entities, the direct service layer connection being layered over top of one or more underlying transport or access network connections; and
   set up security for a single service layer hop connection of the multi-hop end-to-end service layer connection using a negotiated security level value, wherein the negotiated security level value is coordinated with one or more security level values for remaining service layer hop connections of the multi-hop end-to-end service layer connection to ensure that the overall required security level is achieved across the multi-hop end-to-end service layer connection.

2. The apparatus of claim 1, wherein the computer-executable instructions stored in the memory of the apparatus further cause the apparatus to forward a second indication of the overall required security level to another apparatus to set up another service layer connection hop.

3. The apparatus of claim 1, wherein the computer-executable instructions stored in the memory of the apparatus further cause the apparatus to share a hop with another end to end connection.

4. The apparatus of claim 3, wherein the computer-executable instructions stored in the memory of the apparatus further cause the apparatus to set security for a shared hop based on a highest security value.

5. The apparatus of claim 1, wherein the multi-hop end-to-end service layer connection is an oneM2M service layer connection.

6. The apparatus of claim 1, wherein an authentication server provides the overall required security level value to the apparatus to establish a security association.

7. An apparatus comprising a processor and a memory, the apparatus further including computer-executable instructions stored in the memory of the apparatus which, when executed by the processor of the apparatus, cause the apparatus to:
   determine an overall required security level for a multi-hop end-to-end service layer connection, wherein the multi-hop end-to-end service layer connection comprises multiple service layer hop connections, by selecting a highest security layer value of the multiple service layer hop connections; and
   set up security for a shared hop using the overall required security level value.

8. The apparatus of claim 7, wherein the computer-executable instructions stored in the memory of the apparatus further cause the apparatus to reevaluate the security of the shared hop when one of the multiple service layer hop connections is removed from the shared hop.

9. The apparatus of claim 7, wherein the computer-executable instructions stored in the memory of the apparatus further cause the apparatus to set the security for the shared hop based on the highest security value.

10. The apparatus of claim 7, wherein the computer-executable instructions stored in the memory of the apparatus further cause the apparatus to forward the overall required security level to another apparatus to set up another service layer connection hop.

11. The apparatus of claim 7, wherein the multi-hop end-to-end service layer connection is an oneM2M service layer connection.

12. A method for use by an apparatus, wherein the apparatus comprises a processor and memory, and wherein the apparatus further includes computer-executable instructions stored in the memory which, when executed by the processor, perform functions of a method comprising:

receiving a first indication of an overall required security level, the indication comprising a security level value for a multi-hop end-to-end service layer connection, wherein the multi-hop end-to-end service layer connection comprises multiple service layer hop connections, and wherein each service layer hop connection comprises a direct service layer connection between two service layer entities, the direct service layer connection being layered over top of one or more underlying transport or access network connections; and setting up security for a single service layer hop connection of the multi-hop end-to-end service layer connection using a negotiated security level value, wherein the negotiated security level value is coordinated with one or more security level values for remaining service layer hop connections of the multi-hop end-to-end service layer connection to ensure that the overall required security level is achieved across the multi-hop end-to-end service layer connection.

13. The method of claim 12, further comprising forwarding a second indication of the overall required security level to another apparatus to set up another service layer connection hop.

14. The method of claim 12, further comprising sharing a hop with another multi-hop end-to-end service layer connection.

15. The method of claim 12, further comprising setting security for a shared hop based on a highest security value.

16. The method of claim 12, wherein the multi-hop end-to-end service layer connection is a oneM2M service layer connection.

17. The method of claim 12, wherein an authentication server provides the overall required security level value to the apparatus to establish a security association.

18. A method for use by an apparatus, wherein the apparatus comprises a processor and memory, and wherein the apparatus further includes computer-executable instructions stored in the memory which, when executed by the processor, perform functions of a method comprising:

determining an overall required security level for a multi-hop end-to-end service layer connection, wherein the multi-hop end-to-end service layer connection comprises multiple service layer hop connections, by selecting a highest security layer value of the multiple service layer hop connections; and setting up security for a shared hop using the overall required security level value.

19. The method of claim 18, further comprising reevaluating the security of the shared hop when one of the multiple service layer hop connections is removed from the shared hop.

20. The method of claim 18, further comprising setting the security for the shared hop based on the highest security value.

21. The method of claim 18, further comprising forwarding the overall required security level to another apparatus to set up another service layer connection hop.

22. The method of claim 18, wherein the multi-hop end-to-end service layer connection is a oneM2M service layer connection.

* * * * *